(12) United States Patent
Li

(10) Patent No.: US 12,501,414 B2
(45) Date of Patent: Dec. 16, 2025

(54) INFORMATION INDICATION METHOD AND APPARATUS, DEVICE, AND STORAGE MEDIUM

(71) Applicant: GUANGDONG OPPO MOBILE TELECOMMUNICATIONS CORP., LTD., Guangdong (CN)

(72) Inventor: Haitao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 637 days.

(21) Appl. No.: 18/551,294

(22) PCT Filed: Feb. 7, 2020

(86) PCT No.: PCT/CN2020/074541
§ 371 (c)(1),
(2) Date: Sep. 19, 2023

(87) PCT Pub. No.: WO2021/155596
PCT Pub. Date: Aug. 12, 2021

(65) Prior Publication Data
US 2024/0314749 A1   Sep. 19, 2024

(51) Int. Cl.
*H04W 72/0446* (2023.01)
(52) U.S. Cl.
CPC ............... *H04W 72/0446* (2013.01)
(58) Field of Classification Search
CPC .............................................. H04W 72/0446
See application file for complete search history.

(56) References Cited

U.S. PATENT DOCUMENTS

2019/0239093 A1   8/2019 Zhang et al.
2019/0394075 A1   12/2019 Baldemair et al.
2020/0374048 A1*  11/2020 Lei .................. H04L 1/1854

FOREIGN PATENT DOCUMENTS

CN    108235435    6/2018
CN    109152027    1/2019
(Continued)

OTHER PUBLICATIONS

CNIPA, First Office Action for CN Application No. 202080073275.1, Aug. 10, 2023.
(Continued)

*Primary Examiner* — Duc C Ho
(74) *Attorney, Agent, or Firm* — Hodgson Russ LLP

(57) ABSTRACT

Provided in the present application are an information indication method and an apparatus, a device, a system, and a storage medium. The method includes: obtaining a first slot offset value from a first downlink transmission, the first slot offset value being used to determine a time interval between an uplink transmission and a target downlink transmission; receiving target indication information, the target indication information including first indication information and/or second indication information, the first indication information being used to indicate that the first slot offset value is a relative slot offset value or an absolute slot offset value, and the second indication information being used to indicate a relative offset object when the first slot offset value is the relative slot offset value; and determining a time domain position of the uplink transmission based on the first slot offset value and the target indication information.

19 Claims, 10 Drawing Sheets

Obtain a first slot offset value from a first downlink transmission, wherein the first slot offset value is used to determine a time interval between an uplink transmission and a target downlink transmission — 601

Receive target indication information, wherein the target indication information includes first indication information and/or second indication information, the first indication information is used to indicate that the first slot offset value is a relative slot offset value or an absolute slot offset value, and the second indication information is used to indicate a relative offset object when the first slot offset value is the relative slot offset value — 602

Determine a time domain position of the uplink transmission based on the first slot offset value and the target indication information — 603

(56) References Cited

FOREIGN PATENT DOCUMENTS

| | | | |
|---|---|---|---|
| CN | 110035532 | 7/2019 | |
| CN | 110351879 | 10/2019 | |
| CN | 110419186 | 11/2019 | |
| CN | 110650001 | 1/2020 | |
| WO | WO-2019061313 A1 * | 4/2019 | ............ H04W 72/23 |

OTHER PUBLICATIONS

WIPO, International Search Report and Written Opinion for PCT/CN2020/074541, Oct. 26, 2020.

* cited by examiner

INFORMATION INDICATION METHOD AND APPARATUS, DEVICE, AND STORAGE MEDIUM

CROSS-REFERENCE TO RELATED APPLICATIONS

This application is a national stage entry of International Application No. PCT/CN2020/074541, filed Feb. 7, 2020, the entire disclosure of which is incorporated herein by reference.

TECHNICAL FIELD

The present disclosure relates to the communication technical field, and more specifically, to an information indication method, an apparatus, a device, a system and a storage medium.

BACKGROUND

In the New Radio (NR, new air interface) system, in order to ensure the orthogonality of uplink transmissions and avoid interference between uplink transmissions from different terminals in the same cell, the NR system supports an uplink timing advance mechanism. That is, the time when the uplink transmissions of terminals from the same slot but different frequency domain resources reach a network device is aligned. To this end, the network device can configure a slot offset for a terminal when indicating the terminal's uplink transmission, so as to control the time when the terminal's uplink transmission reaches the network device. Usually, the slot offset needs to be greater than round-trip delay of signal propagation between the terminal and the network device.

Currently, 3rd Generation Partnership Project (3GPP) is studying Non Terrestrial Network (NTN) communication methods. The round-trip delay of signal propagation between terminals and network devices in NTN is greatly increased, which is far greater than the slot offset that can be supported in the current standard(s).

SUMMARY

Embodiments of the present disclosure provide an information indication method, an apparatus, a device, a system, and a storage medium. Technical solutions are as follows:

In a first aspect, an information indication method is provided. The method is applied to a terminal, and the method includes:
- obtaining a first slot offset value from a first downlink transmission, wherein the first slot offset value is used to determine a time interval between an uplink transmission and a target downlink transmission;
- receiving target indication information, wherein the target indication information includes first indication information and/or second indication information, the first indication information is used to indicate that the first slot offset value is a relative slot offset value or an absolute slot offset value, and the second indication information is used to indicate a relative offset object when the first slot offset value is the relative slot offset value; and
- determining a time domain position of the uplink transmission based on the first slot offset value and the target indication information.

In a second aspect, an information indication method is provided. The method is applied to a network device, and the method includes:
- sending a first slot offset value in a first downlink transmission, wherein the first slot offset value is used to determine a time interval between an uplink transmission and a target downlink transmission; and
- sending target indication information, wherein the target indication information includes first indication information and/or second indication information, the first indication information is used to indicate that the first slot offset value is a relative slot offset value or an absolute slot offset value, and the second indication information is used to indicate a relative offset object when the first slot offset value is the relative slot offset value;
- wherein the first slot offset value and the target indication information are used to determine a time domain position of the uplink transmission.

In a third aspect, an information indication apparatus is provided. The apparatus is configured in a terminal, and the apparatus includes:
- an obtaining module configured to obtain a first slot offset value from a first downlink transmission, wherein the first slot offset value is used to determine a time interval between an uplink transmission and a target downlink transmission;
- a receiving module configured to receive target indication information, wherein the target indication information includes first indication information and/or second indication information, the first indication information is used to indicate that the first slot offset value is a relative slot offset value or an absolute slot offset value, and the second indication information is used to indicate a relative offset object when the first slot offset value is the relative slot offset value; and
- a determination module configured to determine a time domain position of the uplink transmission based on the first slot offset value and the target indication information.

In a fourth aspect, an information indication apparatus is provided. The apparatus is configured in a network device, and the apparatus includes:
- a first sending module configured to send a first slot offset value in a first downlink transmission, wherein the first slot offset value is used to determine a time interval between an uplink transmission and a target downlink transmission; and
- a second sending module configured to send target indication information, wherein the target indication information includes first indication information and/or second indication information, the first indication information is used to indicate that the first slot offset value is a relative slot offset value or an absolute slot offset value, and the second indication information is used to indicate a relative offset object when the first slot offset value is the relative slot offset value;
- wherein the first slot offset value and the target indication information are used to determine a time domain position of the uplink transmission.

In a fifth aspect, a communication system is provided. The communication system includes a terminal and a network device, the terminal includes the apparatus described in any of the third aspect, and the network device includes the apparatus described in any of the fourth aspect.

In a sixth aspect, a terminal is provided. The terminal includes a processor and a memory, the memory is configured to store at least one instruction, and the at least one instruction is configured to be executed by the processor to implement the method described in any of the first aspect.

In a seventh aspect, a network device is provided. The network device includes a processor and a memory, the memory is configured to store at least one instruction, and the at least one instruction is configured to be executed by the processor to implement the method described in any of the second aspect.

In an eighth aspect, a computer-readable storage medium is provided. Instructions are stored on the computer-readable storage medium. When the instructions are executed by a processor, the method described in the above-mentioned first aspect is implemented.

In a ninth aspect, a computer-readable storage medium is provided. Instructions are stored on the computer-readable storage medium. When the instructions are executed by a processor, the method described in the above-mentioned second aspect is implemented.

In a tenth aspect, a computer program product containing instructions is provided. When the computer program product runs on a computer, the computer is caused to implement the method described in the above-mentioned first aspect.

In an eleventh aspect, a computer program product containing instructions is provided. When the computer program product runs on a computer, the computer is caused to implement the method described in the above-mentioned second aspect.

The beneficial effects brought by the technical solutions provided by the embodiments of the present disclosure at least include the following. A terminal obtains a first slot offset value from a first downlink transmission. The first slot offset value is used to determine a time interval between an uplink transmission and a target downlink transmission. The terminal receives target indication information. The target indication information includes first indication information and/or second indication information. That is, the target indication information may only include the first indication information, or may only include the second indication information, or may include both the first indication information and the second indication information. The first indication information is used to indicate that the first slot offset value is a relative slot offset value or an absolute slot offset value. The second indication information is used to indicate a relative offset object when the first slot offset value is the relative slot offset value. In this way, based on the first slot offset value and the target indication information, the slot offset value between the uplink transmission and the target downlink transmission can be determined, so that the time domain position of the uplink transmission can be determined.

BRIEF DESCRIPTION OF THE DRAWINGS

In order to more clearly illustrate the technical solutions in the embodiments of the present disclosure, the drawings that need to be used in the descriptions of the embodiments will be briefly introduced below. Obviously, the drawings in the following descriptions are only some embodiments of the present disclosure. For those skilled in the art, other drawings can also be obtained based on these drawings without creative effort.

DETAILED DESCRIPTION

Figure 1:
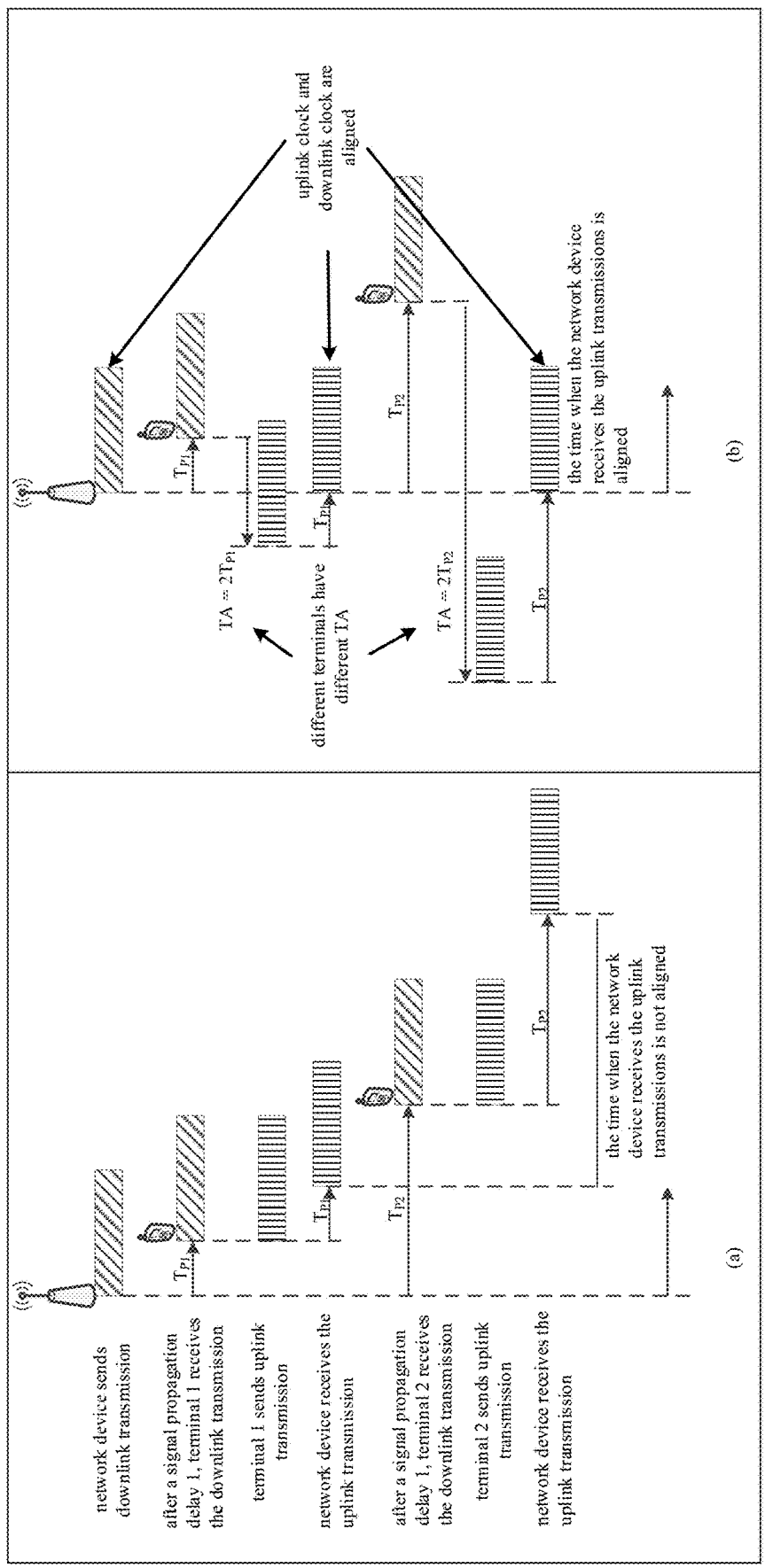
FIG. 1 is a schematic diagram of timing advance provided by an example embodiment of the present disclosure.

In order to make the purposes, technical solutions and advantages of the present disclosure clearer, the implementations of the present disclosure will be further described in detail below in conjunction with the accompanying drawings.

Before introducing the information indication methods provided by the embodiments of the present disclosure in detail, a brief introduction is made to relevant terms and implementation environments involved in the embodiments of the present disclosure.

First, a brief introduction is given to relevant terms involved in the embodiments of the present disclosure.

1. NTN

NTN generally adopts satellite communication to provide communication services to ground users. Compared with ground cellular network communications, satellite communication has many unique advantages. First of all, satellite communications are not restricted by user region. For example, general land communication cannot cover areas such as oceans, mountains, deserts, etc. that cannot be equipped with communication devices or are not covered by communications due to sparse population. For satellite communications, a satellite can cover a large area of the ground, and satellites can orbit the earth, and thus theoretically every corner of the earth can be covered by satellite communications. Secondly, satellite communications have great social value. Satellite communications can cover at a lower cost remote mountainous areas, poor and backward countries or regions, so that people in these regions can enjoy advanced voice communications and mobile Internet technologies, which is conducive to narrowing the digital gap with developed regions and promoting developments of these regions. Thirdly, the satellite communication distance is long, but the cost of communication does not increase significantly as the communication distance increases. Finally, satellite communications have high stability and are not limited by natural disasters.

Communication satellites are divided into Low-Earth Orbit (LEO) satellites, Medium-Earth Orbit (MEO) satellites, Geostationary Earth Orbit (GEO) satellites, and High Elliptical Orbit (HEO) satellites and so on according to different orbital altitudes. At present, the main researches focus on LEO satellites and GEO satellites.

The altitude range of LEO satellites is 500 km~1500 km, and the corresponding orbit period is about 1.5 hours~2 hours. The round-trip delay of signal propagation for single-hop communication between users is generally less than 20 ms. The maximum satellite visible time is 20 minutes. The signal propagation distance is short, the link loss is small, and the requirement for the transmit power of user terminals is not high.

The orbital altitude of the GEO satellite is 35786 km, and the rotation period around the earth is 24 hours. The round-trip delay of signal propagation for single-hop communication between users is generally 250 ms.

In order to ensure satellite coverage and improve the system capacity of the entire satellite communication system, satellites use multiple beams to cover the ground. A satellite can form dozens or even hundreds of beams to cover the ground. A satellite beam can cover tens to hundreds of kilometers of ground area in diameter.

2. Uplink Timing Advance

In order to ensure the orthogonality of uplink transmissions and avoid interference between uplink transmissions from different terminals in the same cell, a network device requires that the time when uplink transmissions of terminals from the same slot but different frequency domain resources arrive at the network device is basically aligned. Since the network device can correctly decode the uplink transmissions sent by the terminals as long as it receives the uplink transmissions sent by the terminals within the range of Cyclic Prefix (CP), the network device requires that the time when the uplink transmissions of the terminals from the same slot but different frequency domain resources reach the network device falls within the CP.

In order to ensure time synchronization of a network device, NR supports an uplink timing advance mechanism. For a terminal, Timing Advance (TA) is essentially a slot offset value between receiving a downlink transmission and sending an uplink transmission. By properly controlling the slot offset value of each terminal, the network device can control the time when uplink transmissions from different terminals arrive at the network device. For a terminal that is farther away from the network device, due to a larger round-trip delay in signal propagation, it needs to send an uplink transmission earlier than a terminal that is closer to the network device.

As shown in (a) of FIG. 1, when terminals do not perform uplink timing advance, there is a large difference in time when uplink transmissions of terminals from the same slot but different frequency domain resources arrive at the network device. As shown in (b) of FIG. 1, when terminals perform uplink timing advance, the time when uplink transmissions of terminals from the same slot but different frequency domain resources arrive at the network device is basically aligned.

It should be noted that, as can be seen from (b) of FIG. 1, the uplink clock and downlink clock of the network device are aligned, but there is an offset between the uplink clock and the downlink clock of a terminal. And, the timing advance of different terminals may be different.

Exemplarily, the network device may determine a TA value of a terminal by measuring an uplink transmission of the terminal. Furthermore, in the following two types of situations, the network device can send a TA command to the terminal:

First type: During a random access procedure, the network device may determine a TA value of a terminal by measuring a received preamble, and send the TA value to the terminal through a Timing Advance Command (TAC) field in a Random Access Response (RAR).

Second type: Although a terminal and a network device have achieved uplink synchronization during a random access procedure, the time when an uplink transmission reaches the network device may change. Exemplarily, for a terminal moving at high speed, the round-trip delay of signal propagation between the terminal and the network device will constantly change. Therefore, the terminal needs to constantly update its TA value to maintain uplink synchronization with the network device.

As an example, a network device may use a closed-loop mechanism to adjust the TA value. That is, the network device may determine a TA value of a terminal by measuring an uplink transmission of the terminal. Therefore, as long as the terminal has an uplink transmission, the network device may use it to estimate the TA value. In theory, any signal sent by the terminal may be used by the network device to measure the TA value, for example, Sounding Reference Signal (SRS), Demodulation Reference Signal (DMRS), Channel Quality Indication (CQI), Acknowledgment/Non-Acknowledgment (ACK/NACK), or Physical Uplink Control Channel (PUSCH) and so on which is sent by the terminal, can all be used for the network device to measure a TA value.

If the TA value of a certain terminal needs to be corrected, the network device will send a TAC to the terminal, requiring the terminal to adjust the TA value. The TAC may be sent to the terminal through a Media Access Control (MAC) Control Element (CE).

3. Random Access Procedure

Figure 2:
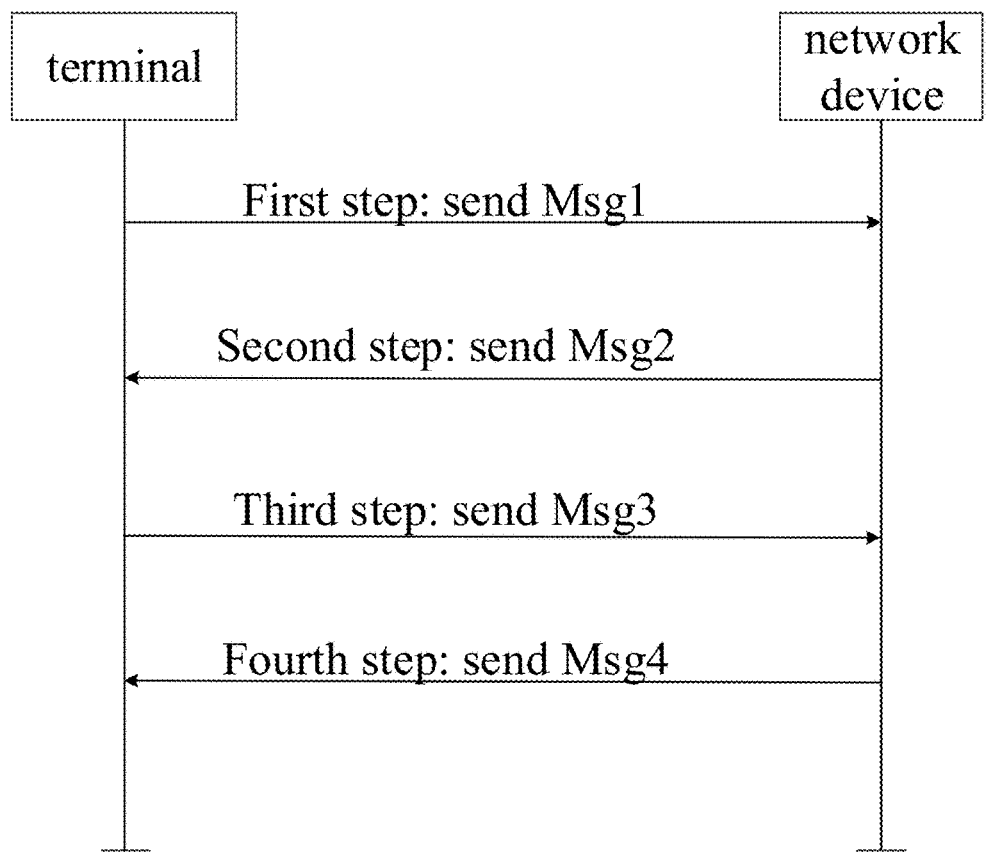
FIG. 2 is a flowchart of a random access procedure provided by an example embodiment of the present disclosure.

Please refer to FIG. 2, a random access procedure generally includes the following four steps.

Step 1: a terminal sends Msg1 to a network device. The Msg1 is a random access preamble sequence (i.e., a preamble).

The terminal sends Msg1 to the network device to notify the network device that there is a random access request, and at the same time enables the network device to estimate the transmission delay between itself and the terminal, and use this to calibrate the uplink time.

As an example, information of a resource for sending the Msg1 may be obtained through resource configuration of a Random Access Channel (RACH). In the Rel-15 NR technologies, RACH resource configuration information configured for terminal access is defined, including 256 kinds, and a cell may indicate in a system message the RACH resource configuration information used by itself to a terminal. Each kind of RACH resource configuration information includes a preamble format, a period, a radio frame offset, a subframe number in a radio frame, a start symbol in a subframe, number of PRACH slots in a subframe, number of PRACH occasions in a PRACH slot, and duration of a PRACH occasion. The time, frequency and code information of a PRACH resource may be determined through the information, so that the terminal may send Msg1 on a corresponding PRACH resource according to the RACH resource configuration information indicated by the network device.

Step 2: after the network device detects the Msg1 sent by the terminal, it sends a RAR (Msg2) to the terminal to inform the terminal of uplink resource information that can be used when sending a next message (Msg3).

One RAR may include response messages for multiple terminals sending preambles, and the response message for each terminal includes a random access preamble identity field RAP ID used by each terminal, resource allocation information of Msg3, TA information, and so on.

Of course, in addition to this, the network device may also perform other operations, such as assigning a Radio Network Temporary Identity (RNTI) to the terminal, etc., which will not be introduced in detail here.

Step 3: the terminal receives the RAR, and sends Msg3 to the network device on the uplink resource indicated by the RAR.

In some embodiments, the terminal may monitor a Physical Downlink Control Channel (PDCCH) in a search space within a RAR time window corresponding to the RAR, so as to receive the RAR. The RAR time window may be configured through a higher layer parameter, and configuration information of the search space of the PDCCH may be indicated through a system message.

If the terminal does not receive the RAR sent by the network device within the RAR time window, it considers that the random access procedure has failed. If the terminal receives a RAR, and a preamble index in the RAR is the same as a preamble index sent by the terminal, it is considered that the RAR has been successfully received. At this time, the terminal may stop monitoring the RAR, and the terminal sends Msg3 to the network device.

As an example, the Msg3 may carry terminal-specific temporary identity information or a terminal identifier from a core network. For example, the terminal identifier may be Serving-Temporary Mobile Subscriber Identity (S-TMSI) or a random number.

Step 4: after receiving Msg3, the network device sends Msg4 to the terminal.

As an example, the Msg4 includes a contention resolution message, and also includes information about an uplink transmission resource allocated to the terminal. Exemplarily, in a conflict resolution mechanism, the network device carries a unique identifier in Msg4 to indicate a terminal that wins the contention. When the terminal receives Msg4 sent by the base station, it will check whether the temporary identity information sent by the terminal in Msg3 is included in the contention resolution message sent by the network device. If the temporary identity information sent by the terminal in Msg3 is included in the contention resolution message sent by the network device, it indicates that the random access procedure of the terminal is successful; otherwise, the terminal considers that the random access procedure has failed, and the terminal needs to initiate the random access procedure again from the first step.

It should be noted that, based on current NTN standardization discussions, all terminals in NTN should have a positioning capability, and NTN supports two types of terminals: one is a terminal without initial TA compensation capability, that is, the terminal sends Msg1 without performing TA compensation during the random access procedure; the other is a terminal with initial TA compensation capability, that is, the terminal uses its own estimated TA to send Msg1 during the random access procedure.

For these two types of terminals, the TA determination method is different.

First, for a terminal that does not have the initial TA compensation capability, the network device broadcasts a common TA based on a round-trip delay of signal propagation between a ground reference point and a satellite. The terminal does not perform TA compensation when sending Msg1, and then the network device indicates a TA value to the terminal in the RAR, so that the terminal can accumulate the broadcasted common TA and the TA indicated in the RAR to obtain a TA used for sending Msg3. It should be noted that the TA is only introduced here to illustrate the random access procedures of different types of terminals, and the TA is different from the first TA and the second TA in the following description.

Figure 3:
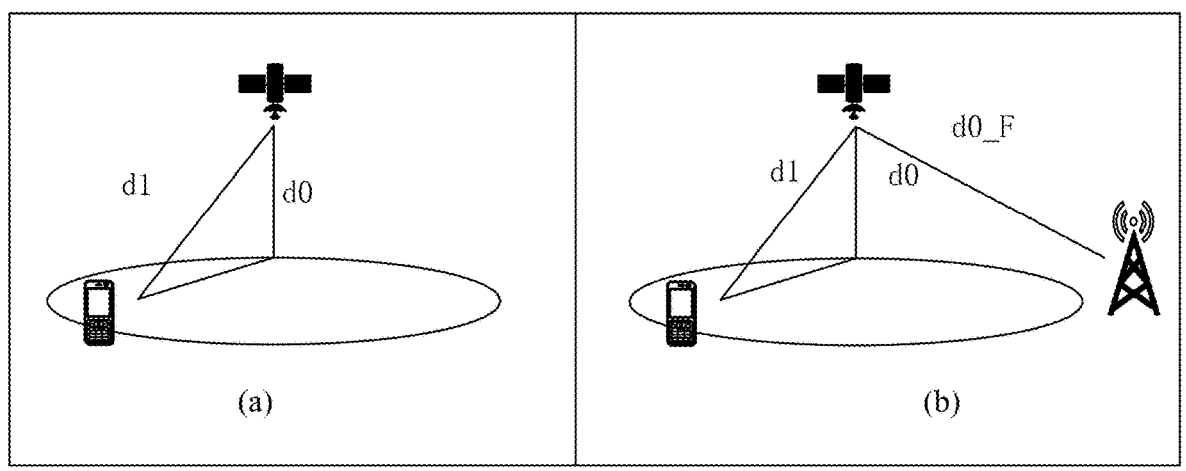
FIG. 3 is a schematic diagram of a signal propagation round-trip delay provided by an example embodiment of the present disclosure.

The determination method of the common TA is shown in FIG. 3. For a regenerative payload, as shown (a) of FIG. 3, the common TA=2*d0/c, where do refers to the distance between the ground reference point and the satellite, and c refers to the speed of light.

For a bent-pipe payload, TA=2*(d0+d0_F)/c, where d0 refers to the distance between the ground reference point and the satellite, c refers to the speed of light, and d0_F refers to the distance between the satellite and a ground base station.

Figure 4:
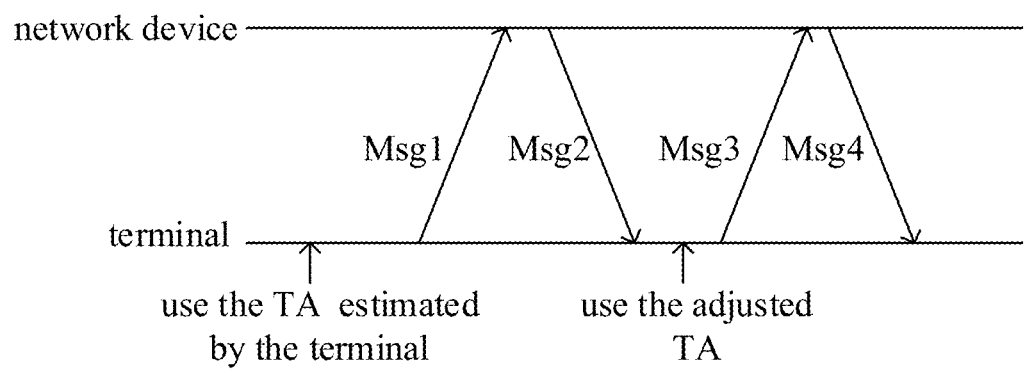
FIG. 4 is a schematic diagram of timing advance adjustment provided by an example embodiment of the present disclosure.

Secondly, for a terminal that has the initial TA compensation capability, its random access procedure is shown in FIG. 4.

Specifically, the terminal estimates its own TA based on the positioning capability, and uses its estimated TA to send Msg1.

Furthermore, after receiving Msg1, the network device determines a TA adjustment value of the terminal, and indicates the TA adjustment value to the terminal through Msg2. Since the network device does not know the actual round-trip delay of signal propagation with the terminal at this time, the network device can schedule a resource of Msg3 of the terminal according to the maximum uplink scheduling delay.

Then, the terminal adjusts the TA based on indication in the received RAR, and sends Msg3 on the uplink resource scheduled by the network device.

Furthermore, after receiving the Msg3 of the terminal, the network device may determine the actual round-trip delay of signal propagation with the terminal.

It should be noted that during the random access procedure, regardless of whether the terminal has the initial TA compensation capability, the RAR sent by the network device contains a UL grant field, which is used to indicate the uplink resource of Msg3. The terminal sends Msg3 on the PUSCH resource indicated by the UL grant of the RAR.

Next, the implementation environments involved in the embodiments of the present disclosure will be briefly introduced.

The technical solutions of the embodiments of the present disclosure can be applied to various communication systems, for example: Global System of Mobile communication (GSM) system, Code Division Multiple Access (CDMA), Wideband Code Division Multiple Access (WCDMA) system, General Packet Radio Service (GPRS), Long Term Evolution (LTE) system, Frequency Division Duplex (FDD) system, Time Division Duplex (TDD) system, LTE-A (advanced long term evolution) system, NR system, evolution system of NR system, LTE-based access to unlicensed spectrum (LTE-U) system, NR-based access to unlicensed spectrum (NR-U) system, Universal Mobile Telecommunications System (UMTS), Worldwide interoperability for microwave access (WiMAX) communication system, Wireless Local Area Network (WLAN), wireless fidelity (WiFi), next generation communication system or other communication systems, etc.

Generally speaking, the number of connections supported by traditional communication systems is limited and easy to implement. However, with the developments of communication technologies, mobile communication systems will not only support traditional communications, but also support, for example, device to device (D2D) communication, machine to machine (M2M) communication, machine type communication (MTC), and vehicle to vehicle (V2V) communication, etc., and the embodiments of the present disclosure can also be applied to these communication systems.

The system architecture and service scenarios described in the embodiments of the present disclosure are for more clearly illustrating the technical solutions of the embodiments of the present disclosure, and do not constitute limitations on the technical solutions provided by the embodiments of the present disclosure. One of ordinary skill in this art can understand that, with the evolution of architecture and the emergence of new service scenarios, the technical solutions provided by the embodiments of the present disclosure are also applicable to similar technical problems.

Figure 5:
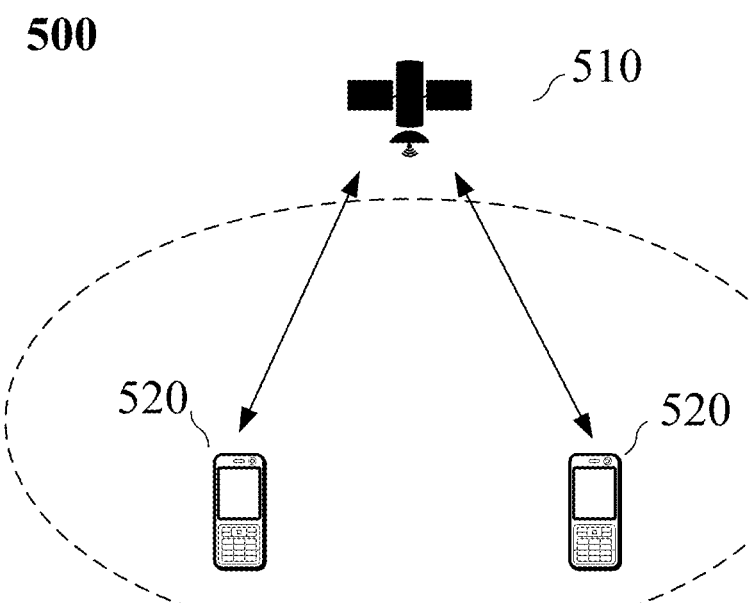
FIG. 5 is a schematic diagram of an implementation environment provided by an example embodiment of the present disclosure.

Exemplarily, a communication system 500 in which the embodiments of the present disclosure may be applied is shown in FIG. 5. The communication system 500 may include a network device 510, and the network device 510 may be a device for communicating with a terminal 520 (or referred to as a communication terminal, terminal). The network device 510 may provide communication coverage for a specific geographic area, and may communicate with terminals located within the coverage area. Optionally, the network device 510 may be an Evolutional Node B (eNB), or a wireless controller in a Cloud Radio Access Network (CRAN), or the network device may be a mobile switch center, a relay station, an access point, a vehicle-mounted device, a wearable device, a hub, a switch, a bridge, a router, a network-side device in 5G networks or a network device in future communication systems, etc.

The communication system 500 further includes at least one terminal 520 within the coverage area of the network device 510. The "terminal" as used herein may be connected in the following manners (including but not limited to): the terminal device may be connected via wired lines, such as via Public Switched Telephone Networks (PSTN), Digital Subscriber Line (DSL), digital cables, or direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal is connected via an Internet of Things (IoT) device. A terminal set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal in 5G networks, or a terminal in the future evolved PLMN, etc.

Optionally, D2D communication can be performed between terminals 520.

Optionally, a 5G communication system or a 5G network may also be called an NR system or an NR network.

FIG. 5 exemplarily shows one network device and two terminals. Optionally, the communication system 500 may include multiple network devices and each network device may include other numbers of terminals within the coverage area of each network device, and embodiments of the present disclosure do not impose specific limitations on this.

Optionally, the communication system 500 may further include other network entities such as a network controller or a mobility management entity, which is not limited in the embodiments of the present disclosure.

It should be understood that a device with a communication function in the network/system in the embodiments of the present disclosure may be referred to as a communication device. Taking the communication system 500 shown in FIG. 5 as an example, the communication device may include a network device 510 and a terminal 520 with a communication function, and the network device 510 and the terminal 520 may be the specific devices described above, which will not be repeated here. The communication device may also include other devices in the communication system 500, such as a network controller, a mobility management entity or other network entities, which are not limited in the embodiments of the present disclosure.

After introducing the relevant terms and implementation environments involved in the embodiments of the present disclosure, the information indication methods provided by the embodiments of the present disclosure will be described in detail in conjunction with the accompanying drawings.

Figure 6:
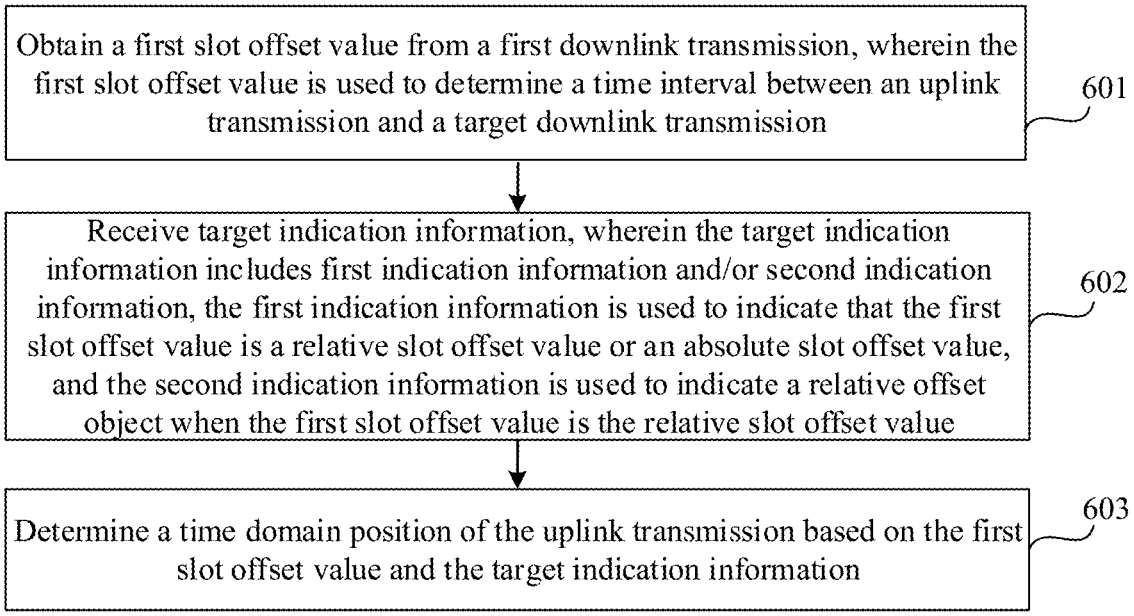
FIG. 6 is a flowchart of an information indication method provided by an example embodiment of the present disclosure.

FIG. 6 is a flowchart of an information indication method according to an example embodiment. The information indication method may be applied to the implementation environment shown in FIG. 5 above, and the information indication method may include at least some of the following steps:

In step 601, a first slot offset value is obtained from a first downlink transmission. The first slot offset value is used to determine a time interval between an uplink transmission and a target downlink transmission.

As an example, the first downlink transmission may be a transmission of a downlink signal and/or a downlink channel. The downlink signal may be Synchronization Signal Block (SSB), Channel Status Information Reference Signal (CSI-RS), downlink Demodulation Reference Signal (DMRS) and so on. The downlink channel may be Physical Broadcast Channel (PBCH), PDCCH, Physical Downlink Shared Channel (PDSCH), etc., which is not limited in this embodiment.

Similarly, the target downlink transmission may also be a transmission of a downlink signal and/or a downlink channel, which is not limited in this embodiment.

It should be noted that the target downlink transmission may be the first downlink transmission, or may be other downlink transmission except the first downlink transmission, which is not limited in this embodiment.

As an example, the uplink transmission may be a transmission of an uplink signal and/or an uplink channel. The uplink signal may be SRS, uplink DMRS and so on. The uplink channel may be PUSCH, Physical Uplink Control Channel (PUCCH), Physical Random Access Channel (PRACH), etc., which is not limited in this embodiment.

That is, the terminal may receive the first downlink transmission sent by the network device, and obtain the first slot offset value in the received first downlink transmission. Because the first slot offset value can be used to determine a time interval between an uplink transmission and a target downlink transmission, the terminal can determine, according to the first slot offset value, how long after receiving the target downlink transmission the terminal can send the uplink transmission.

In step 602, target indication information is received. The target indication information includes first indication information and/or second indication information. The first indication information is used to indicate that the first slot offset value is a relative slot offset value or an absolute slot offset value. The second indication information is used to indicate a relative offset object when the first slot offset value is the relative slot offset value.

The target indication information may be sent by the network device, and the target indication information may include only the first indication information, or may include only the second indication information, or may include both the first indication information and the second indication information.

In a case where the target indication information includes only the first indication information, the terminal may determine whether the first slot offset is the relative slot offset value or the absolute slot offset value according to the first indication information.

As an example, when the first indication information indicates that the first slot offset value is the relative slot offset value, it may indicate that the first slot offset value is an increment relative to a reference slot offset value, which means that the time interval between the uplink transmission and the target downlink transmission should be jointly determined by the first slot offset value and the reference slot offset value.

The reference slot offset value may be indicated by the network device. Exemplarily, the terminal may obtain the reference slot offset value in the received first downlink transmission, or the terminal may obtain the reference slot offset value in a received system message.

When the first indication information indicates that the first slot offset value is the absolute slot offset value, it indicates that the reference slot offset value is not needed, and the time interval between the uplink transmission and the target downlink transmission may be directly determined based on the first slot offset value.

In a case where the target indication information includes only the second indication information, the first slot offset value is the relative slot offset value, and the terminal may determine the relative offset object of the first slot offset value according to the second indication information, that is, the reference slot offset of the first slot offset value may be determined according to the second indication information.

In a case where the target indication information includes first indication information and second indication information, whether the first slot offset value is the relative slot offset value or the absolute slot offset value may be determined according to the first indication information. Furthermore, when it is determined according to the first indication information that the first slot offset value is the relative slot offset value, the relative offset object of the first slot offset value may be determined according to the second indication information, that is, the reference slot offset value of the first slot offset value is determined.

As an example, the target indication information is carried in a system message. Alternatively, the target indication information is carried by Radio Resource Control (RRC) signaling. Alternatively, the target indication information is carried by a Medium Access Control Control Element (MAC CE).

That is, the target indication information may be indicated by the network device to the terminal through a system message. In this case, when the terminal receives the system message, the target indication information may be obtained from the system message. Alternatively, the target indication information may be indicated by the network device to the terminal through RRC signaling. In this case, when the terminal receives the RRC signaling, the target indication information may be obtained from the RRC signaling. Alternatively, the target indication information may be indicated by the network device to the terminal through the MAC CE. In this case, when the terminal receives the MAC CE, the target indication information may be obtained from the MAC CE.

In step 603, a time domain position of the uplink transmission is determined based on the first slot offset value and the target indication information.

That is, the terminal may determine the time domain position of the uplink transmission based on the first slot offset value and the target indication information indicated by the network device, that is, determine how long after receiving the target downlink transmission the terminal device can send the uplink transmission.

In some embodiments, according to different target indication information, the terminal may determine the time domain position of the uplink transmission based on the first two or all of: the first slot offset value, the target indication information and the reference slot offset value.

As an example, when the target indication information includes first indication information, and the first indication information indicates that the first slot offset value is the relative slot offset value, the terminal may, base on the first slot offset value and the reference slot offset value, determine how long after receiving the target downlink transmission the terminal can send the uplink transmission. That is, in this case, based on the first slot offset value and the target indication information, the implementation of determining the time domain position of the uplink transmission may include: obtaining a reference slot offset value, and determining the time domain position of the uplink transmission based on the first slot offset value, the target indication information and the reference slot offset value.

As an example, when the target indication information includes the first indication information, and the first indication information indicates that the first slot offset value is the absolute slot offset value, the terminal may, based on the first slot offset value, determines how long after receiving the target downlink transmission the terminal may send the uplink transmission. That is, in this case, the terminal determines the time domain position of the uplink transmission based on the first slot offset value and the target indication information.

As an example, when the target indication information includes the second indication information, the terminal may, based on the first slot offset value and the relative offset object indicated by the second indication information, determine how long after receiving the target downlink transmission the terminal may send the uplink transmission.

As an example, when the target indication information includes the first indication information and the second indication information, if the first indication information indicates that the first slot offset value is the absolute slot offset value, the terminal may determine, based on the first slot offset value, how long after receiving the target downlink transmission the terminal may send the uplink transmission.

If the first indication information indicates that the first slot offset value is the relative slot offset value, the terminal may determine the relative slot offset value based on the second indication information. In this way, the terminal can determine, based on the first slot offset value and the relative offset object, how long after receiving the target downlink transmission the terminal may send the uplink transmission.

In the embodiments of the present disclosure, the terminal obtains the first slot offset value from the first downlink transmission, and the first slot offset value is used to determine the time interval between the uplink transmission and the target downlink transmission. The terminal receives the target indication information, and the target indication information includes the first indication information and/or the second indication information. That is, the target indication information may include only the first indication information, may include only the second indication information, or may include both the first indication information and the second indication information. The first indication information is used to indicate that the first slot offset value is the relative slot offset value or the absolute slot offset value, and the second indication information is used to indicate a relative offset object when the first slot offset value is the relative slot offset value. In this way, based on the first slot offset value and the target indication information, the slot offset value between the uplink transmission and the target downlink transmission can be determined, so that the time domain position of the uplink transmission can be determined.

Figure 7:
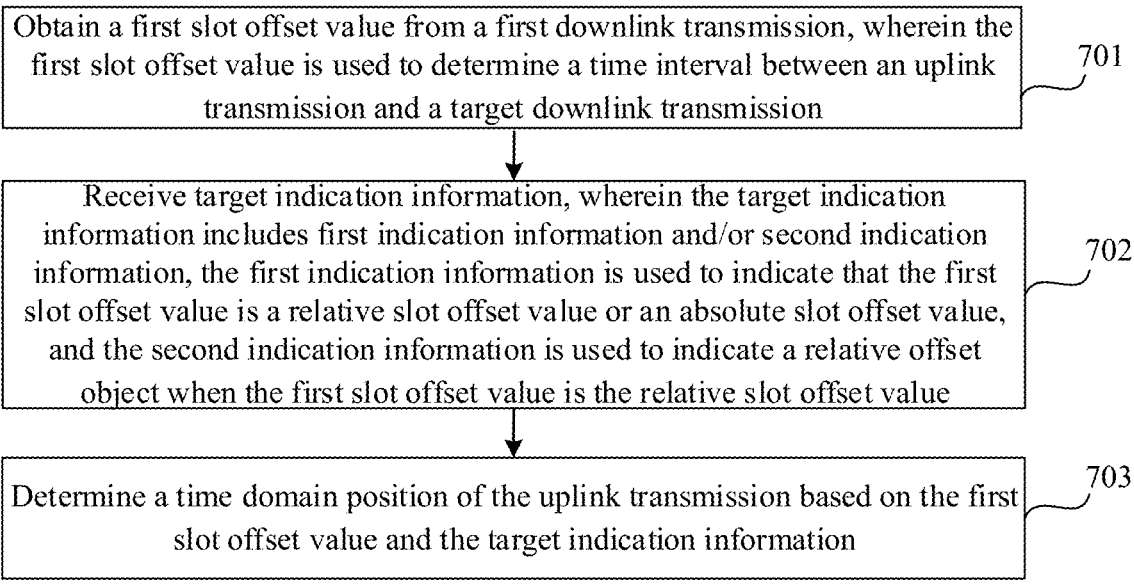
FIG. 7 is a flowchart of an information indication method provided by another example embodiment of the present disclosure.

FIG. 7 is a flowchart of an information indication method according to an example embodiment. The information indication method may be applied to the implementation environment shown in FIG. 5 above, and the information indication method may include at least some of the following contents:

In step 701, a first slot offset value is obtained from a first downlink transmission. The first slot offset value is used to determine a time interval between an uplink transmission and a target downlink transmission.

For a specific implementation, reference may be made to step 601 in the embodiment in FIG. 6, which will not be repeated here.

In step 702, target indication information is received. The target indication information includes first indication information, and the first indication information is used to indicate that the first slot offset value is a relative slot offset value or an absolute slot offset value.

For a specific implementation, reference may be made to step 601 in the embodiment in FIG. 6, which will not be repeated here.

As an example, the target indication information is carried in a system message. Alternatively, the target indication information is carried by RRC signaling. Alternatively, the target indication information is carried by MAC CE.

For a specific implementation, reference may be made to step 601 in the embodiment in FIG. 6, which will not be repeated here.

In step 703, a time domain position of the uplink transmission is determined based on the first slot offset value and the target indication information.

In a possible implementation, the target indication information includes the first indication information, the first downlink transmission is a downlink transmission of a random access response, and the target downlink transmission is the downlink transmission of the random access response.

In this case, based on the first slot offset value and the target indication information, an implementation of determining the time domain position of the uplink transmission may be: determining a first downlink slot number of the target downlink transmission; determining a first parameter based on uplink subcarrier spacing of the uplink transmission; and based on the first downlink slot number, the first parameter, the first slot offset value and the first indication information, determining the time domain position of the uplink transmission.

The first downlink slot number refers to a downlink slot number in which the terminal receives the downlink transmission of the random access response.

As an example, the downlink transmission of the random access response may be the PDSCH used to transmit Msg2 in the random access response.

As an example, the uplink transmission may be a PUSCH used to transmit Msg3 in the random access response.

That is, when the target indication information includes only the first indication information, and both the first downlink transmission and the target downlink transmission are the downlink transmission of the random access response, the terminal may determine the time domain position of the uplink transmission according to the first slot offset value, the first indication information, the downlink slot number in which the downlink transmission of the random access response is received and the first parameter determined according to uplink subcarrier spacing.

For example, when the target indication includes only the first indication information, and both the first downlink transmission and the target downlink transmission are the PDSCH of Msg2 in the random access response, the terminal may determine the time domain position of the PUSCH of Msg3 in the random access response according to the first slot offset value, the first indication information, the downlink slot number of the PDSCH of Msg2 in the random access response and the first parameter determined according to the uplink subcarrier spacing.

As an example, the implementations of determining the time domain position of the uplink transmission based on the first downlink slot number, the first parameter, the first slot offset value and the first indication information may include the following two implementations:

First implementation: if the first indication information indicates that the first slot offset value is the absolute slot offset value, obtaining a first uplink slot number by adding the first downlink slot number, the first parameter and the first slot offset value; and determining the time domain position of the uplink transmission based on the first uplink slot number.

That is, when the first indication information indicates that the first slot offset value is the absolute slot offset value, the terminal may add the first parameter and the first slot offset value to obtain a target slot offset value, and determine the target slot offset value to be a time interval between the target downlink transmission and the uplink transmission. Furthermore, the terminal may add the first downlink slot number and the target slot offset value to obtain the first uplink slot number, so that the terminal may determine the time domain position to which the first uplink slot number belongs as the time domain position of the uplink transmission.

Figure 8:
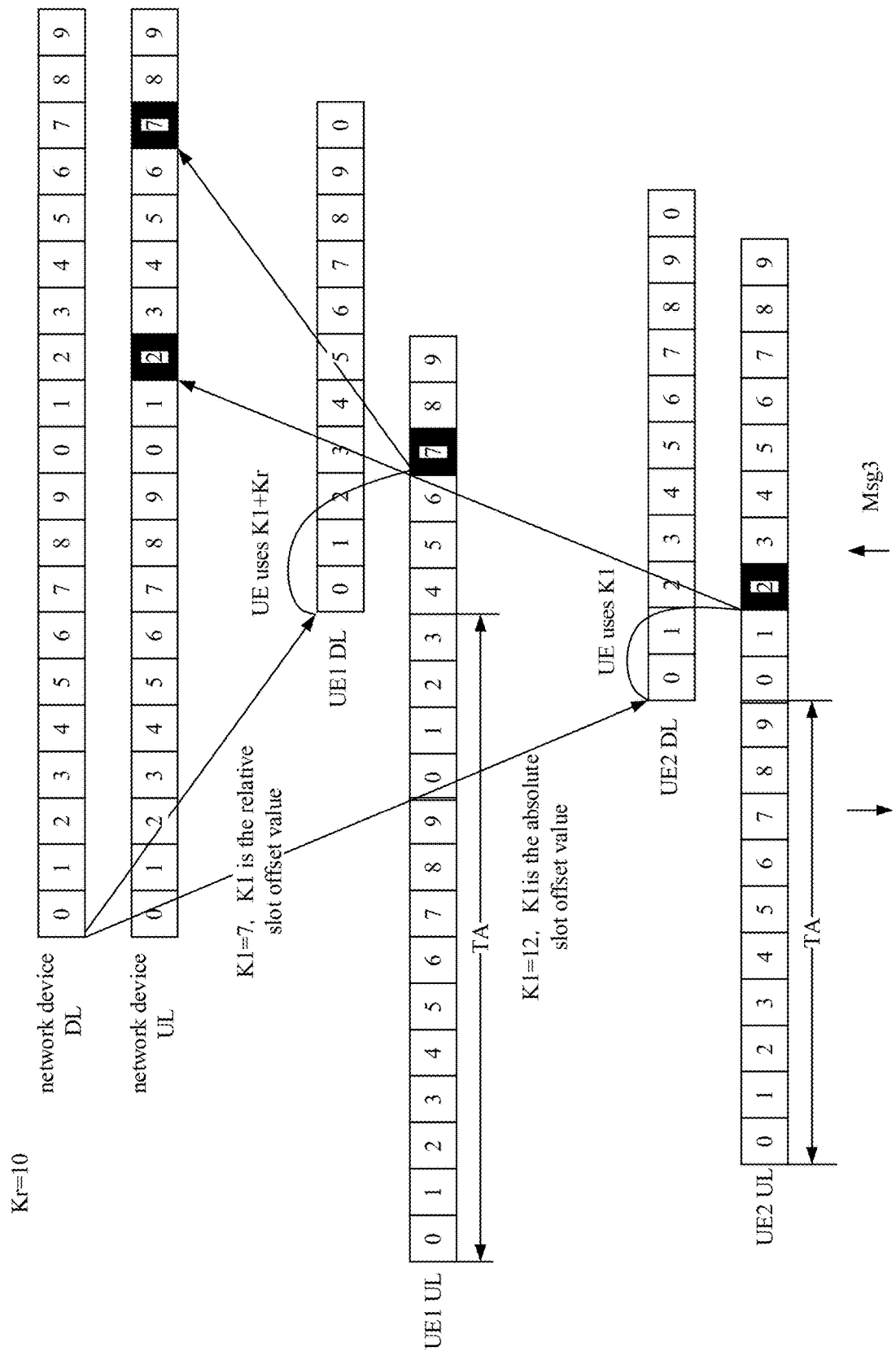
FIG. 8 is a schematic diagram of an information indication method provided by an example embodiment of the present disclosure.

For example, as shown in FIG. 8, assuming that the first uplink slot number is N1, when the first indication information indicates that the first slot offset value is the absolute slot offset value, the first uplink slot number can be determined by the following formula (1):

$$N1 = n + K1 + \Delta \quad (1)$$

where n is the first downlink slot number, K1 is the first slot offset value, $\Delta$ is the first parameter, and K1+$\Delta$ is the target slot offset value.

Second implementation: if the first indication information indicates that the first slot offset value is the relative slot offset value, obtaining a reference slot offset value; obtaining a second uplink slot number by adding the first downlink slot number, the first parameter, the first slot offset value and the reference slot offset value; and based on the second uplink slot number, determining the time domain position of the uplink transmission.

That is, when the first indication information indicates that the first slot offset value is the relative slot offset value, the terminal may also obtain a reference slot offset value. The terminal may add the first parameter, the first slot offset value and the reference slot offset value to obtain a target slot offset value, and determine the target slot offset value to be the time interval between the target downlink transmission and the uplink transmission. Furthermore, the terminal may add the first downlink slot number and the target slot offset value to obtain the second uplink slot number, so that the terminal may determine the time domain position to which the second uplink slot number belongs as the time domain position of the uplink transmission.

For example, as shown in FIG. 8, assuming that the second uplink slot number is N2, when the first indication information indicates that the first slot offset value is the relative slot offset value, the second uplink slot number may be determined by the following formula (2):

$$N2 = n + K1 + Kr + \Delta \quad (2)$$

where n is the first downlink slot number, K1 is the first slot offset value, Kr is the reference slot offset value, $\Delta$ is the first parameter, and K1+Kr+$\Delta$ is the target slot offset value.

As an example, the implementation of obtaining the reference slot offset value may be as follows: if Radio Resource Control (RRC) signaling or Medium Access Control (MAC) Control Element (CE) carries the first Timing Advance (TA), obtaining the first TA as the reference slot offset value.

That is, when the first TA is carried in the RRC signaling or MAC CE sent by the network device, the terminal may use the first TA obtained from the RRC signaling or MAC CE as the reference slot offset value, so that the terminal may determine the time domain position of the uplink transmission based on the first TA.

As an example, the implementation of obtaining the reference slot offset value may be as follows: if the first TA is not carried in the RRC signaling and the MAC CE, obtaining a second TA from a system message to obtain the reference slot offset value.

That is, when the RRC signaling or the MAC CE sent by the network device does not carry the first TA, the terminal may obtain the second TA in the system message, and use the second TA as the reference slot offset value. In this way, the terminal may determine the time domain position of the uplink transmission based on the second TA.

Exemplarily, the first TA is a TA determined based on an actual position of the terminal, and the second TA is a TA determined based on a ground reference point.

The ground reference point may be any ground reference point within the coverage of the network device. For example, the ground reference point may be a ground reference point closest to the network device within the coverage of the network device.

That is, when the network device can obtain the current actual position of the terminal, the first TA may be determined by the network device according to the actual position of the terminal. When the network device cannot obtain the actual position of the current terminal, the second TA may be determined by the network device according to ground reference point within the coverage of the network device.

In the embodiments of the present disclosure, the terminal obtains the first slot offset value from the first downlink transmission, and the first slot offset value is used to determine the time interval between the uplink transmission and the target downlink transmission. The terminal receives target indication information, where the target indication information includes first indication information. The first indication information is used to indicate that the first slot offset value is a relative slot offset value or an absolute slot offset value. In this way, based on the first slot offset value and the target indication information, the slot offset value between the uplink transmission and the target downlink transmission can be determined, so that the time domain position of the uplink transmission can be determined.

Furthermore, since the relative slot offset value is introduced when determining the time domain position of the uplink transmission, that is, the transmitted first slot offset value can be an increment based on the reference slot offset value, so that the signaling overhead for transmitting the first slot offset value can be reduced.

Moreover, under the same signaling overhead, using the relative slot offset value can more accurately control the slot offset value between the uplink transmission and the target downlink transmission, that is, the time domain position of the uplink transmission can be determined more accurately.

In an optional embodiment based on FIG. 7, the target indication information also includes second indication information. In this case, the implementation of obtaining the reference slot offset value may be: according to the second indication information, obtaining the reference slot offset value.

That is, in addition to the first indication information, the target indication information further includes the second indication information. In a case where the first indication information indicates that the first slot offset value is the relative slot offset value, the relative offset object indicated by the second indication information may be determined, and the reference slot offset value may be determined according to the relative offset object.

As an example, the implementation of obtaining the second uplink slot number by adding the first downlink slot number, the first parameter, the first slot offset value and the reference slot offset value may include the following two implementations:

First implementation: when the second indication information indicates that the relative offset object of the first slot offset value is the first TA, obtaining the second uplink slot number by adding the first downlink slot number, the first parameter, the first slot offset value and the first TA.

That is, when the second indication information indicates that the relative offset object of the first slot offset value is the first TA, it may be determined that the reference slot offset value is the first TA. In this way, the terminal may add the first parameter, the first slot offset value and the first TA to obtain the target slot offset value, and determine the target slot offset value to be the time interval between the target downlink transmission and the uplink transmission. Furthermore, the terminal may add the first downlink slot number and the target slot offset value to obtain the second uplink slot number, so that the terminal may determine the time domain position to which the second uplink slot number belongs as the time domain position of the uplink transmission.

Figure 9:
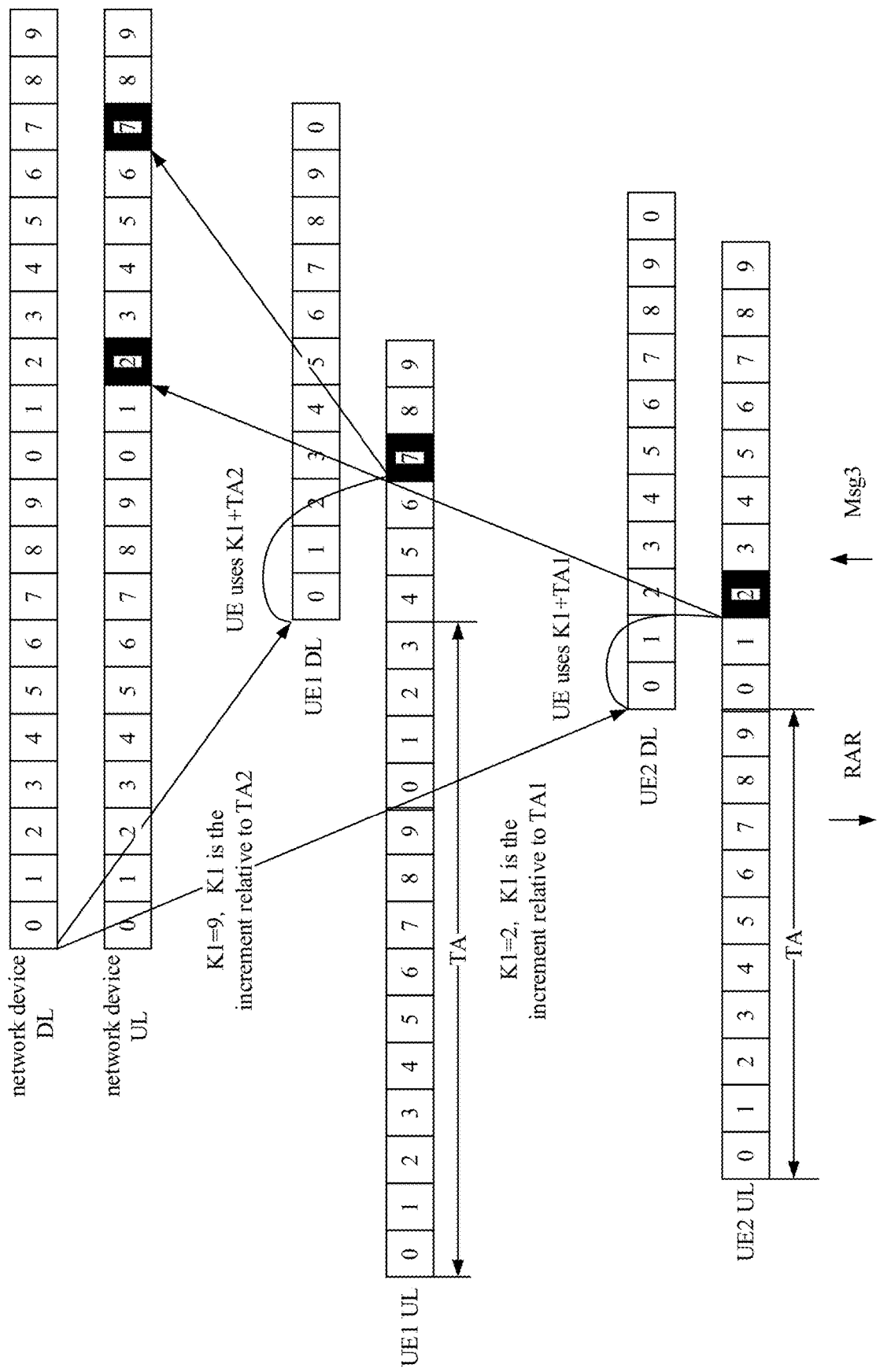
FIG. 9 is a schematic diagram of an information indication method provided by another example embodiment of the present disclosure.

For example, as shown in FIG. 9, assuming that the second uplink slot number is N2, when the second indication information indicates that the relative offset object of the first slot offset value is the first TA, the second uplink slot number may be determined by the following formula (3):

$$N2 = n + K1 + TA1 + \Delta \quad (3)$$

where n is the first downlink slot number, K1 is the first slot offset value, TA1 is the first TA, $\Delta$ is the first parameter, and K1+TA1+$\Delta$ is the target slot offset value.

Second implementation: when the second indication information indicates that the relative offset object of the first slot offset value is the second TA, obtaining the second uplink slot number by adding the first downlink slot number, the first parameter, the first slot offset value and the second TA.

That is, when the second indication information indicates that the relative offset object of the first slot offset value is the second TA, it may be determined that the reference slot offset value is the second TA. In this way, the terminal may add the first parameter, the first slot offset value and the second TA to obtain the target slot offset value, and determine that the target slot offset value is the time interval between the target downlink transmission and uplink transmission. Furthermore, the terminal may add the first downlink slot number and the target slot offset value to obtain the second uplink slot number, so that the terminal may determine the time domain position to which the second uplink slot number belongs as the time domain position of the uplink transmission.

For example, as shown in FIG. 9, assuming that the second uplink slot number is N2, when the second indication information indicates that the relative offset object of the first slot offset value is the second TA, the second uplink slot number may be determined by the following formula (4):

$$N2 = n + K1 + TA2 + \Delta \quad (4)$$

where n is the first downlink slot number, K1 is the first slot offset value, TA2 is the second TA, $\Delta$ is the first parameter, and K1+TA2+$\Delta$ is the target slot offset value.

In the embodiments of the present disclosure, the terminal obtains the first slot offset value from the first downlink transmission, and the first slot offset value is used to determine the time interval between the uplink transmission and the target downlink transmission. The terminal receives the target indication information, and the target indication information includes both the first indication information and the second indication information. The first indication information is used to indicate that the first slot offset value is the relative slot offset value or the absolute slot offset value, and the second indication information is used to indicate the relative offset object when the first slot offset value is the relative slot offset value. In this way, based on the first slot offset value and the target indication information, the slot offset value between the uplink transmission and the target downlink transmission can be determined, so that the time domain position of the uplink transmission can be determined.

Furthermore, since the relative slot offset value is introduced when determining the time domain position of the uplink transmission, that is, the transmitted first slot offset value may be an increment based on the reference slot offset value, so that the signaling overhead for transmitting the first slot offset value can be reduced.

Moreover, under the same signaling overhead, using the relative slot offset value can more accurately control the slot offset value between the uplink transmission and the target downlink transmission, that is, the time domain position of the uplink transmission can be determined more accurately.

As an example, an embodiment of the present disclosure also provides an information indication method, which may be applied to the implementation environment shown in FIG. 5 above. The information indication method may include at least part of the following content:

In step A1, a first slot offset value is obtained from a first downlink transmission. The first slot offset value is used to determine a time interval between an uplink transmission and a target downlink transmission.

For a specific implementation, reference may be made to step 601 in the embodiment in FIG. 6, which will not be repeated here.

In step A2, target indication information is received. The target indication information includes first indication information, and the first indication information is used to indicate that the first slot offset value is a relative slot offset value or an absolute slot offset value.

For a specific implementation, reference may be made to step 601 in the embodiment in FIG. 6, which will not be repeated here.

As an example, the target indication information is carried in a system message. Alternatively, the target indication information is carried by RRC signaling. Alternatively, the target indication information is carried by MAC CE.

For a specific implementation, reference may be made to step 601 in the embodiment in FIG. 6, which will not be repeated here.

In step A3, a time domain position of the uplink transmission is determined based on the first slot offset value and the target indication information.

In a possible implementation, the target indication information includes the first indication information, the first downlink transmission is a first Physical Downlink Control Channel (PDCCH) indicating uplink scheduling, and the target downlink transmission is the first PDCCH.

In this case, an implementation of determining the time domain position of the uplink transmission based on the first slot offset value and the target indication information may be: determining a second downlink slot number of the first PDCCH; based on the second downlink slot number, uplink subcarrier spacing of the uplink transmission, downlink subcarrier spacing of the target downlink transmission, the first slot offset value and the first indication information, determining the time domain position of the uplink transmission.

The first PDCCH may indicate a time-frequency resource or modulation and coding scheme or the like used by the terminal for the uplink transmission.

The second downlink slot number refers to a downlink slot number in which the terminal receives the first PDCCH.

As an example, the uplink transmission may be a PUSCH for transmitting uplink data.

That is, when the target indication information includes only the first indication information, and both the first downlink transmission and the target downlink transmission are the first PDCCH, the terminal may determine the time domain position of the uplink transmission according to the first slot offset value, the first indication information, the downlink slot number in which the first PDCCH is received, the uplink subcarrier spacing of the uplink transmission, and the downlink subcarrier spacing of the first PDCCH.

For example, when the target indication includes only the first indication information, and both the first downlink transmission and the target downlink transmission are the first PDCCH, the terminal may determine the time domain position of the PUSCH for transmitting the uplink data according to the first slot offset value, the first indication information, the downlink slot number in which the first PDCCH is received, the uplink subcarrier spacing of the PUSCH, and the downlink subcarrier spacing of the first PDCCH.

As an example, implementation of determining the time domain position of the uplink transmission based on the second downlink slot number, the uplink subcarrier spacing of the uplink transmission, the downlink subcarrier spacing of the target downlink transmission, the first slot offset value and the first indication information may include the following two kinds of implementations:

First implementation: if the first indication information indicates that the first slot offset value is the absolute slot offset value, determining the time domain position of the uplink transmission based on the second downlink slot number, the uplink subcarrier spacing of the uplink transmission, the downlink subcarrier spacing of the target downlink transmission, and the first slot offset value.

That is, when the first indication information indicates that the first slot offset value is the absolute slot offset value, the terminal may determine the target slot offset value base on the uplink subcarrier spacing of the uplink transmission, the downlink subcarrier spacing of the target downlink transmission, and the first slot offset value. The target slot offset value is a time interval between the target downlink transmission and the uplink transmission. Furthermore, the terminal may obtain a third uplink slot number based on the second downlink slot number and the target slot offset value, so that the terminal may determine the time domain position to which the third uplink slot number belongs as the time domain position of the uplink transmission.

Figure 10:
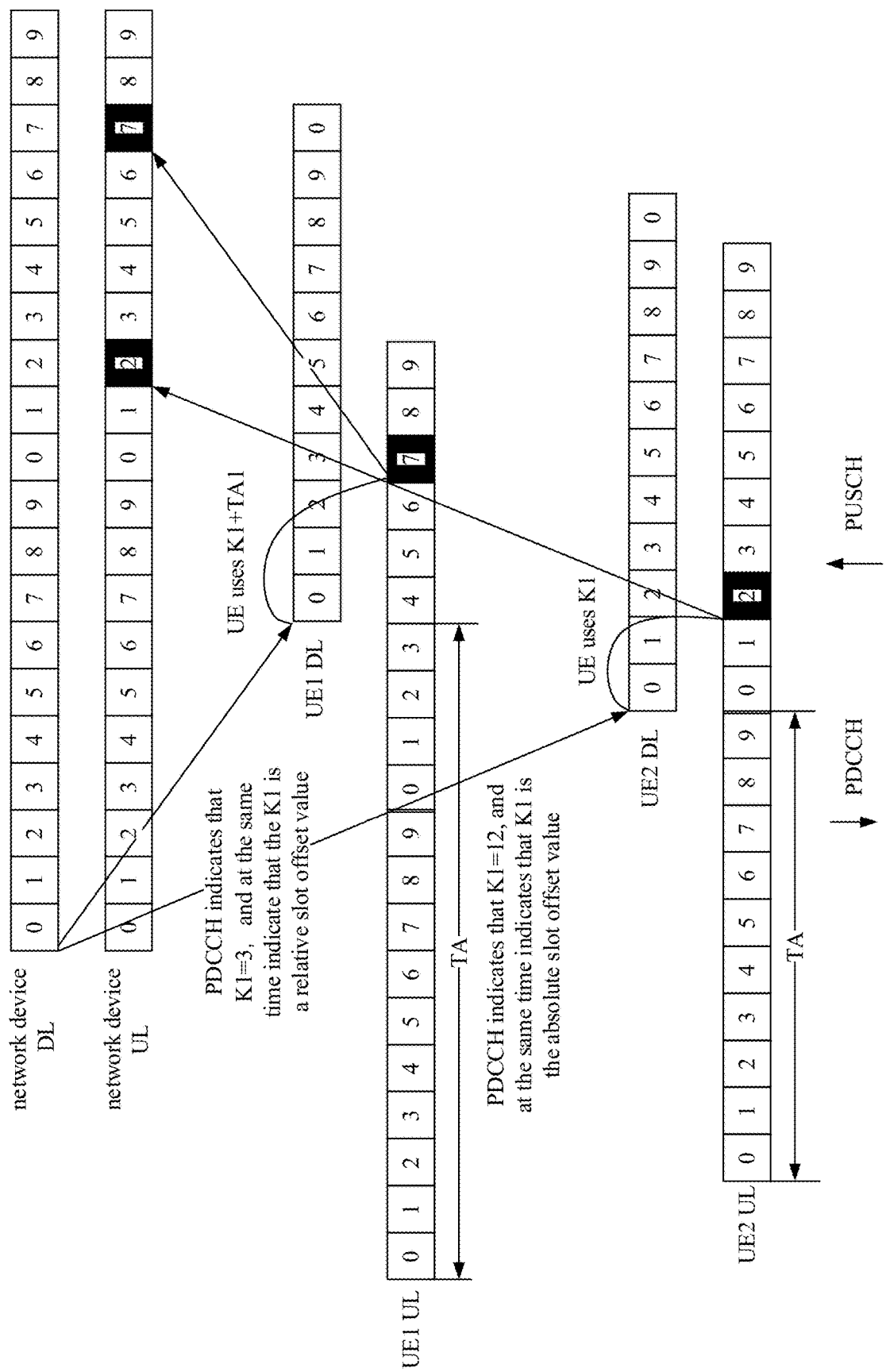
FIG. 10 is a schematic diagram of an information indication method provided by another example embodiment of the present disclosure.

For example, as shown in FIG. 10, assuming that the third uplink slot number is N3, when the first indication information indicates that the first slot offset value is the absolute slot offset value, the third uplink slot number may be determined by the following formula (5):

$$N3 = \left\lfloor n \cdot \frac{2^{\mu_{PUSCH}}}{2^{\mu_{PDCCH}}} \right\rfloor + K1 \tag{5}$$

where n is the second downlink slot number, K1 is the first slot offset value, $\mu_{PUSCH}$ is the uplink subcarrier spacing of the uplink transmission, $\mu_{PDCCH}$ is the downlink subcarrier spacing of the target downlink transmission, and $$\left\lfloor n \cdot \frac{2^{\mu_{PUSCH}}}{2^{\mu_{PDCCH}}} \right\rfloor$$

is a slot number obtained by conversion of the downlink slot number.

Second implementation: if the first indication information indicates that the first slot offset value is the relative slot offset value, obtaining the first TA, where the first TA is a TA determined based on the actual position of the terminal; determining the time domain position of the uplink transmission based on the second downlink slot number, the uplink subcarrier spacing of the uplink transmission, the downlink subcarrier spacing of the target downlink transmission, the first slot offset value and the first TA.

That is, when the first indication information indicates that the first slot offset value is the relative slot offset value, the terminal may obtain the first TA as a reference slot offset value. The terminal may determine a target slot offset value based on the uplink subcarrier spacing of the uplink transmission, the downlink subcarrier spacing of the target downlink transmission, the first slot offset value and the first TA. The target slot offset value is a time interval between the target downlink transmission and the uplink transmission. Furthermore, the terminal may obtain a fourth uplink slot number based on the second downlink slot number and the target slot offset value, so that the terminal may determine the time domain position to which the fourth uplink slot number belongs as the time domain position of the uplink transmission.

For example, as shown in FIG. 10, assuming that the fourth uplink slot number is N4, when the first indication information indicates that the first slot offset value is the absolute slot offset value, the fourth uplink slot number may be determined by the following formula (6):

$$N4 = \left\lfloor n \cdot \frac{2^{\mu PUSCH}}{2^{\mu PDCCH}} \right\rfloor + K1 + TA1 \quad (6)$$

where n is the second downlink slot number, K1 is the first slot offset value, TA1 is the first TA, $\mu_{PUSCH}$ is the uplink subcarrier spacing of the uplink transmission, $\mu_{PUSCH}$ is the downlink subcarrier spacing of the target downlink transmission, and $$\left\lfloor n \cdot \frac{2^{\mu PUSCH}}{2^{\mu PDCCH}} \right\rfloor$$

is a slot number obtained by conversion of the downlink slot number.

In the embodiments of the present disclosure, the terminal obtains the first slot offset value from the first downlink transmission, and the first slot offset value is used to determine the time interval between the uplink transmission and the target downlink transmission. The terminal receives the target indication information, where the target indication information includes first indication information. The first indication information is used to indicate that the first slot offset value is the relative slot offset value or the absolute slot offset value. In this way, based on the first slot offset value and the target indication information, the slot offset value between the uplink transmission and the target downlink transmission can be determined, so that the time domain position of the uplink transmission can be determined.

Furthermore, since the relative slot offset value is introduced when determining the time domain position of the uplink transmission, that is, the transmitted first slot offset value may be an increment based on the reference slot offset value, so that the signaling overhead for transmitting the first slot offset value can be reduced.

Moreover, under the same signaling overhead, using the relative slot offset value can more accurately control the slot offset value between the uplink transmission and the target downlink transmission, that is, the time domain position of the uplink transmission can be determined more accurately.

As an example, an embodiment of the present disclosure also provides an information indication method, which may be applied to the implementation environment shown in FIG. 5 above. The information indication method may include at least part of the following content:

In step B1, a first slot offset value is obtained from a first downlink transmission. The first slot offset value is used to determine a time interval between an uplink transmission and a target downlink transmission.

For a specific implementation, reference may be made to step 601 in the embodiment in FIG. 6, which will not be repeated here.

In step B2, target indication information is received. The target indication information includes first indication information, and the first indication information is used to indicate that the first slot offset value is a relative slot offset value or an absolute slot offset value.

For a specific implementation, reference may be made to step 601 in the embodiment in FIG. 6, which will not be repeated here.

As an example, the target indication information is carried in a system message. Alternatively, the target indication information is carried by RRC signaling. Alternatively, the target indication information is carried by MAC CE.

For a specific implementation, reference may be made to step 601 in the embodiment in FIG. 6, which will not be repeated here.

In step B3, a time domain position of the uplink transmission is determined based on the first slot offset value and the target indication information.

In a possible implementation, the target indication information includes the first indication information, the first downlink transmission is a second PDCCH indicating downlink scheduling, and the target downlink transmission is a first Physical Downlink Shared Channel (PDSCH), or in other words, the first PDSCH is a PDSCH scheduled by the second PDCCH.

In this case, an implementation of determining the time domain position of the uplink transmission based on the first slot offset value and the target indication information may be: determining a third downlink slot number of the first PDSCH; and based on the third downlink slot number, the first slot offset value and the first indication information, determining the time domain position of the uplink transmission.

The third downlink slot number refers to a downlink slot number in which the terminal receives the first PDSCH.

As an example, the uplink transmission may be a PUCCH for feeding back ACK/NACK.

That is, when the target indication information includes only the first indication information, and the first downlink transmission is the second PDCCH, and the target downlink transmission is the first PDSCH, the terminal may determine the time domain position of the uplink transmission according to the first slot offset value, the first indication information and the downlink slot number in which the first PDSCH is received.

For example, when the target indication includes only the first indication information, and the first downlink transmission is the second PDCCH, and the target downlink transmission is the first PDSCH, the terminal may determine the time domain position of the PUCCH for ACK/NACK feedback according to the first slot offset value, the first indication information, and the downlink slot number in which the first PDSCH is received.

As an example, an implementation of determining the time domain position of the uplink transmission based on the third downlink slot number, the first slot offset value and the first indication information may include the following two kinds of implementations:

First implementation: if the first indication information indicates that the first slot offset value is the absolute slot offset value, determining the time domain position of uplink transmission based on the third downlink slot number and the first slot offset value.

That is, when the first indication information indicates that the first slot offset value is the absolute slot offset value, the terminal may determine the first slot offset value as a target slot offset value, and the target slot offset value is a time interval between the target downlink transmission and the uplink transmission. Furthermore, the terminal may add the first downlink slot number and the target slot offset value to obtain a fifth uplink slot number, so that the terminal may determine the time domain position to which the fifth uplink slot number belongs as the time domain position of the uplink transmission.

Figure 11:
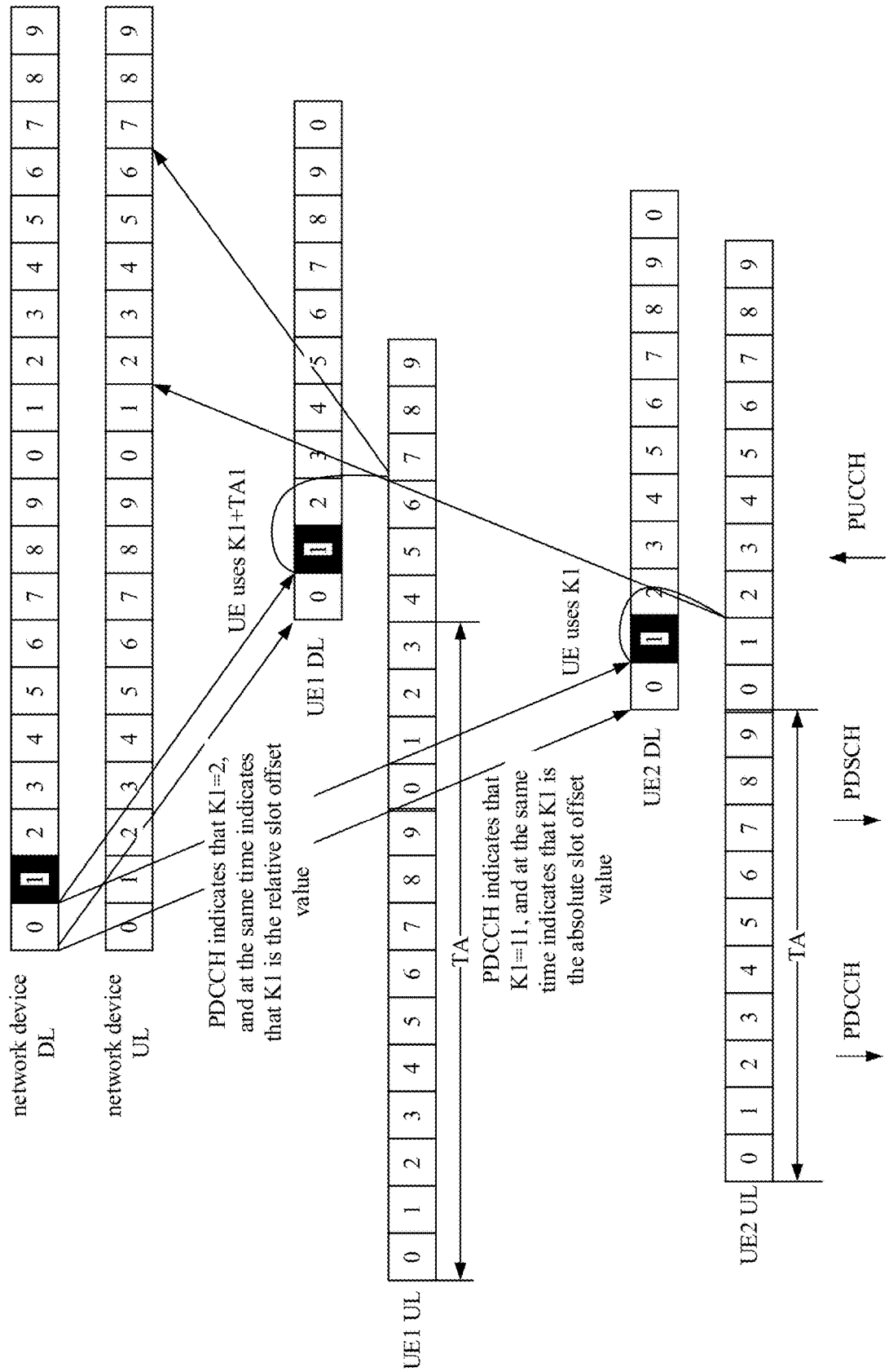
FIG. 11 is a schematic diagram of an information indication method provided by another example embodiment of the present disclosure.

For example, as shown in FIG. 11, assuming that the fifth uplink slot number is N5, when the first indication information indicates that the first slot offset value is the absolute slot offset value, the fifth uplink slot number may be determined by the following formula (7):

$$N5 = n + K1 \quad (7)$$

wherein n is the third downlink slot number, and K1 is the first slot offset value.

Second implementation: if the first indication information indicates that the first slot offset value is the relative slot offset value, obtaining the first TA, where the first TA is a TA determined based on the actual position of the terminal; and based on the third downlink slot number, the first slot offset value and the first TA, determining the time domain position of the uplink transmission.

That is, when the first indication information indicates that the first slot offset value is the relative slot offset value, the terminal may also obtain the first TA, and determine the first TA as the reference slot offset value. The terminal may add the first slot offset value and the first TA to obtain a target slot offset value, and determine that the target slot offset value is a time interval between target downlink transmission and uplink transmission. Furthermore, the terminal may add the third downlink slot number and the target slot offset value to obtain a sixth uplink slot number, so that the terminal may determine the time domain position to which the sixth uplink slot number belongs as the time domain position of the uplink transmission.

For example, as shown in FIG. 11, assuming that the sixth uplink slot number is N6, when the first indication information indicates that the first slot offset value is the relative slot offset value, the sixth uplink slot number may be determined by the following formula (8):

$$N6 = n + K1 + TA1 \quad (8)$$

where n is the third downlink slot number, K1 is the first slot offset value, TA1 is the first TA, and K1+TA1 is the target slot offset value.

In the embodiments of the present disclosure, the terminal obtains the first slot offset value from the first downlink transmission, and the first slot offset value is used to determine the time interval between the uplink transmission and the target downlink transmission. The terminal receives target indication information, where the target indication information includes the first indication information. The first indication information is used to indicate that the first slot offset value is a relative slot offset value or an absolute slot offset value. In this way, based on the first slot offset value and the target indication information, the slot offset value between the uplink transmission and the target downlink transmission can be determined, so that the time domain position of the uplink transmission can be determined.

Furthermore, since the relative slot offset value is introduced when determining the time domain position of the uplink transmission, that is, the transmitted first slot offset value may be an increment based on the reference slot offset value, so that the signaling overhead for transmitting the first slot offset value can be reduced.

Moreover, under the same signaling overhead, using the relative slot offset value can more accurately control the slot offset value between the uplink transmission and the target downlink transmission, that is, the time domain position of the uplink transmission can be determined more accurately.

As an example, an embodiment of the present disclosure also provides an information indication method, which may be applied to the implementation environment shown in FIG. 5 above. The information indication method may include at least part of the following content:

In step C1, a first slot offset value is obtained from the first downlink transmission, where the first slot offset value is used to determine a time interval between an uplink transmission and a target downlink transmission.

For a specific implementation, reference may be made to step 601 in the embodiment in FIG. 6, which will not be repeated here.

In step C2, target indication information is received, where the target indication information includes second indication information, and the second indication information is used to indicate a relative offset object when the first slot offset value is a relative slot offset value.

For a specific implementation, reference may be made to step 601 in the embodiment in FIG. 6, which will not be repeated here.

As an example, the target indication information is carried in a system message. Alternatively, the target indication information is carried by RRC signaling. Alternatively, the target indication information is carried by MAC CE.

For a specific implementation, reference may be made to step 601 in the embodiment in FIG. 6, which will not be repeated here.

In step C3, a time domain position of the uplink transmission is determined based on the first slot offset value and the target indication information.

In a possible implementation, the target indication information includes the second indication information, the first slot offset value is the relative slot offset value, the first downlink transmission is a downlink transmission of a random access response, and the target downlink transmission is the downlink transmission of the random access response.

In this case, the implementation of determining the time domain position of the uplink transmission based on the first slot offset value and the target indication information may be: obtaining a reference slot offset value according to the second indication information; determining a fourth downlink slot number of the target downlink transmission; determining a first parameter based on uplink subcarrier spacing of the uplink transmission; and based on the first slot offset value, the fourth downlink slot number, the first parameter and the reference slot offset value, determining the time domain position of the uplink transmission.

The fourth downlink slot number refers to a downlink slot number in which the terminal receives the downlink transmission of the random access response.

As an example, the downlink transmission of the random access response may be a PDSCH used to transmit Msg2 in the random access response.

As an example, the uplink transmission may be a PUSCH used to transmit Msg3 in the random access response.

When the target indication information includes only the second indication information, it can be indicated that the first slot offset value is a relative slot offset value. In this way, the terminal may determine the relative offset object indicated by the second indication information, and determine the reference slot offset based on the relative offset object.

Further, the terminal may determine the time domain position of the uplink transmission according to the first slot offset value, the reference slot offset, the downlink slot number in which the downlink transmission of the random access response is received, and the first parameter determined according to the uplink subcarrier spacing.

Exemplarily, the terminal may add the first parameter, the first slot offset value and the reference slot offset value to obtain the target slot offset value, and determine that the target slot offset value is the time interval between the target downlink transmission and the uplink transmission value. Furthermore, the terminal may add the fourth downlink slot number and the target slot offset value to obtain a seventh uplink slot number, so that the terminal may determine the time domain position to which the seventh uplink slot number belongs as the time domain position of the uplink transmission.

It should be noted that the reference slot offset value may be the first TA or the second TA, which is not limited in the embodiment.

In the embodiments of the present disclosure, the terminal obtains the first slot offset value from the first downlink transmission, and the first slot offset value is used to determine the time interval between the uplink transmission and the target downlink transmission. The terminal receives target indication information, where the target indication information includes the second indication information. The second indication information is used to indicate a relative offset object when the first slot offset value is a relative slot offset value. In this way, based on the first slot offset value and the target indication information, the slot offset value between the uplink transmission and the target downlink transmission can be determined, so that the time domain position of the uplink transmission can be determined.

Furthermore, since the relative slot offset value is introduced when determining the time domain position of the uplink transmission, that is, the transmitted first slot offset value may be an increment based on the reference slot offset value, so that the signaling overhead for transmitting the first slot offset value can be reduced.

Moreover, under the same signaling overhead, using the relative slot offset value can more accurately control the slot offset value between the uplink transmission and the target downlink transmission, that is, the time domain position of the uplink transmission can be determined more accurately.

Figure 12:
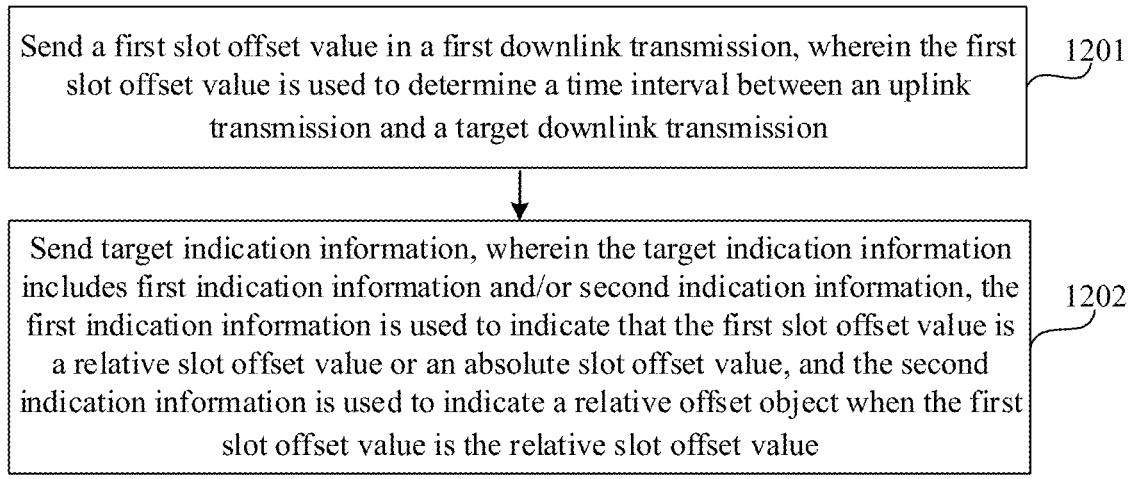
FIG. 12 is a flowchart of an information indication method provided by an example embodiment of the present disclosure.

FIG. 12 is a flowchart of an information indication method according to an example embodiment. The information indication method may be applied to the implementation environment shown in FIG. 5 above. The information indication method may include at least some of the following content:

In step 1201, a first slot offset value is sent in a first downlink transmission, where the first slot offset value is used to determine a time interval between an uplink transmission and a target downlink transmission.

That is, the network device may send the first slot offset value to the terminal, the first slot offset value may be carried in the first downlink transmission, and the first slot offset value may be used by the terminal to determine the time domain position for sending the uplink transmission.

For a specific implementation, reference may be made to step 601 in the embodiment in FIG. 6, which will not be repeated here.

In step 1202, target indication information is sent, where the target indication information includes first indication information and/or second indication information, the first indication information is used to indicate that the first slot offset value is a relative slot offset value or an absolute slot offset value, and the second indication information is used to indicate a relative offset object when the first slot offset value is the relative slot offset value.

That is, the network device may send the target indication information to the terminal, where the target indication information may include only the first indication information, may include only the second indication information, or may include both the first indication information and the second indication information.

As an example, the first slot offset value and the target indication information are used to determine the time domain position of the uplink transmission.

That is, the first slot offset value and the target indication information sent by the network device to the terminal may be used to indicate the terminal to determine the time domain position for sending the uplink transmission, that is, indicating the terminal to determine how long after receiving the target downlink transmission the terminal may send the uplink transmission.

For a specific implementation, reference may be made to step 601 in the embodiment in FIG. 6, which will not be repeated here.

In this embodiment of the present disclosure, the network device sends the first downlink transmission, and the first downlink transmission carries the first slot offset value. The first slot offset value is used by the terminal to determine a time interval between the uplink transmission and the target downlink transmission. The network device sends the target indication information, and the target indication information includes the first indication information and/or the second indication information, that is, the target indication information may include only the first indication information, may include only the second indication information, or may include both the first indication information and the second indication information. The first indication information is used to indicate that the first slot offset value is a relative slot offset value or an absolute slot offset value. The second indication information is used to indicate a relative offset object when the first slot offset value is the relative slot offset value. In this way, the network device can indicate the slot offset value between the terminal's uplink transmission and the target downlink transmission by sending the first slot offset value and the target indication information, so that the terminal can determine the time domain position of the uplink transmission.

Figure 13:
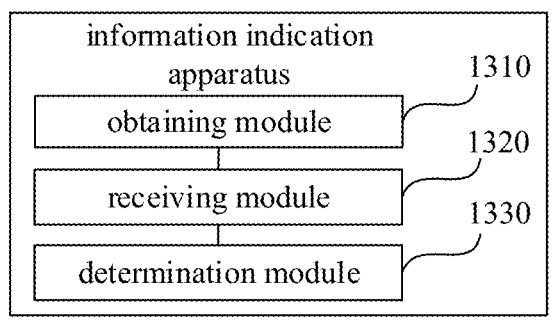
FIG. 13 is a schematic structural diagram of an information indication apparatus provided by an example embodiment of the present disclosure.

FIG. 13 is a schematic structural diagram of an information indication apparatus according to an example embodiment. The apparatus may be configured in a terminal and the apparatus includes: an obtaining module 1310, a receiving module 1320 and a determination module 1330.

The obtaining module 1310 is configured to obtain a first slot offset value from a first downlink transmission, wherein the first slot offset value is used to determine a time interval between an uplink transmission and a target downlink transmission.

The receiving module 1320 is configured to receive target indication information, wherein the target indication information includes first indication information and/or second indication information, the first indication information is used to indicate that the first slot offset value is a relative slot offset value or an absolute slot offset value, and the second indication information is used to indicate a relative offset object when the first slot offset value is the relative slot offset value.

The determination module 1330 is configured to determine a time domain position of the uplink transmission based on the first slot offset value and the target indication information.

In a possible implementation of the present disclosure, the target indication information includes the first indication information, the first downlink transmission is a downlink transmission of a random access response, and the target downlink transmission is the downlink transmission of the random access response;

wherein the determination module 1330 is configured to:

determine a first downlink slot number of the target downlink transmission;

determine a first parameter based on uplink subcarrier spacing of the uplink transmission; and determine the time domain position of the uplink transmission based on the first downlink slot number, the first parameter, the first slot offset value and the first indication information.

In a possible implementation of the present disclosure, the determination module 1330 is configured to:

in response to that the first indication information indicates that the first slot offset value is the absolute slot offset value, obtain a first uplink slot number by adding the first downlink slot number, the first parameter and the first slot offset; and determine the time domain position of the uplink transmission based on the first uplink slot number.

In a possible implementation of the present disclosure, the determination module 1330 is configured to:

in response to that the first indication information indicates that the first slot offset value is the relative slot offset value, obtain a reference slot offset value;

obtain a second uplink slot number by adding the first downlink slot number, the first parameter, the first slot offset value and the reference slot offset value; and determine the time domain position of the uplink transmission based on the second uplink slot number.

In a possible implementation of the present disclosure, the determination module 1330 is configured to:

in response to that Radio Resource Control (RRC) signaling or Medium Access Control (MAC) Control Element (CE) carries first Timing Advance (TA), obtain the first TA as the reference slot offset value.

In a possible implementation of the present disclosure, the determination module 1330 is configured to:

in response to that RRC signaling and MAC CE do not carry first TA, obtain a second TA from a system message to obtain the reference slot offset value.

In a possible implementation of the present disclosure, the first TA is a TA determined based on an actual position of the terminal, and the second TA is a TA determined based on a ground reference point.

In a possible implementation of the present disclosure, the target indication information further includes second indication information, and the determination module 1330 is configured to:

obtain the reference slot offset value according to the second indication information.

In a possible implementation of the present disclosure, the determination module 1330 is configured to:

when the second indication information indicates that the relative offset object of the first slot offset value is the first TA, obtain the second uplink slot number by adding the first downlink slot number, the first parameter, the first time slot offset value and the first TA.

In a possible implementation of the present disclosure, the determination module 1330 is configured to:

when the second indication information indicates that the relative offset object of the first slot offset value is the second TA, obtain the second uplink slot number by adding the first downlink slot number, the first parameter, the first time slot offset value and the second TA.

In a possible implementation of the present disclosure, the target indication information includes the first indication information, the first downlink transmission is a first Physical Downlink Control Channel (PDCCH) indicating uplink scheduling, and the target downlink transmission is the first PDCCH;

wherein the determination module 1330 is configured to:

determine a second downlink slot number of the first PDCCH; and determine the time domain position of the uplink transmission based on the second downlink slot number, uplink subcarrier spacing of the uplink transmission, downlink subcarrier spacing of the target downlink transmission, the first slot offset value and the first indication information.

In a possible implementation of the present disclosure, the determination module 1330 is configured to:

in response to that the first indication information indicates that the first slot offset value is the absolute slot offset value, determine the time domain position of the uplink transmission based on the second downlink slot number, the uplink subcarrier spacing of the uplink transmission, the downlink subcarrier spacing of the target downlink transmission and the first slot offset value.

In a possible implementation of the present disclosure, the determination module 1330 is configured to:

in response to that the first indication information indicates that the first slot offset value is the relative slot offset value, obtain a first TA, wherein the first TA is a TA determined based on an actual position of the terminal; and determine the time domain position of the uplink transmission based on the second downlink slot number, the uplink subcarrier spacing of the uplink transmission, the downlink subcarrier spacing of the target downlink transmission, the first slot offset value and the first indication information.

In a possible implementation of the present disclosure, the target indication information includes the first indication information, the first downlink transmission is a second PDCCH indicating downlink scheduling, and the target downlink transmission is a first Physical Downlink Shared Channel (PDSCH);

wherein the determination module 1330 is configured to:

determine a third downlink slot number of the first PDSCH; and determine the time domain position of the uplink transmission based on the third downlink slot number, the first slot offset value and the first indication information.

In a possible implementation of the present disclosure, the determination module 1330 is configured to:

in response to that the first indication information indicates that the first slot offset value is the absolute slot offset value, determine the time domain position of the uplink transmission based on the third downlink slot number and the first slot offset value.

In a possible implementation of the present disclosure, the determination module 1330 is configured to:

in response to that the first indication information indicates that the first slot offset value is the relative slot offset value, obtain a first TA, wherein the first TA is a TA determined based on an actual position of the terminal; and determine the time domain position of the uplink transmission based on the third downlink slot number, the first slot offset value and the first TA.

In a possible implementation of the present disclosure, the target indication information includes the second indication information, the first slot offset value is the relative slot offset value, the first downlink transmission is a downlink transmission of a random access response, and the target downlink transmission is the downlink transmission of the random access response;

wherein the determination module 1330 is configured to:
obtain a reference slot offset value according to the second indication information;
determine a fourth downlink slot number of the target downlink transmission;
determine a first parameter based on uplink subcarrier spacing of the uplink transmission; and
determine the time domain position of the uplink transmission based on the first slot offset value, the fourth downlink slot number, the first parameter and the reference slot offset value.

In a possible implementation of the present disclosure, the target indication information is carried by a system message; or,
the target indication information is carried by RRC signaling; or,
the target indication information is carried by MAC CE.

In the embodiments of the present disclosure, the terminal obtains the first time slot offset value from the first downlink transmission, and the first time slot offset value is used to determine the time interval between the uplink transmission and the target downlink transmission. The terminal receives the target indication information, and the target indication information includes the first indication information and/or the second indication information. That is, the target indication information may include only the first indication information, may include only the second indication information, or may include both the first indication information and the second indication information. The first indication information is used to indicate that the first time slot offset value is a relative time slot offset value or an absolute time slot offset value, and the second indication information is used to indicate a relative offset object when the first slot offset value is the relative slot offset value. In this way, based on the first time slot offset value and the target indication information, the time slot offset value between the uplink transmission and the target downlink transmission can be determined, so that the time domain position of the uplink transmission can be determined.

Furthermore, since the relative time slot offset value is introduced when determining the time domain position of the uplink transmission, that is, the transmitted first time slot offset value may be an increment based on the reference time slot offset value, so that the signaling overhead for transmitting the first slot offset value can be reduced.

Moreover, under the same signaling overhead, using the relative time slot offset value can more accurately control the time slot offset value between the uplink transmission and the target downlink transmission, that is, the time domain position of the uplink transmission can be determined more accurately.

Figure 14:
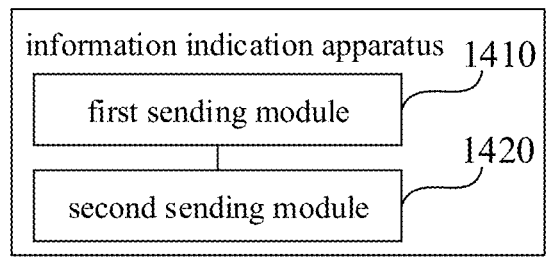
FIG. 14 is a schematic structural diagram of an information indication apparatus provided by another example embodiment of the present disclosure.

FIG. 14 is a schematic structural diagram of an information indication apparatus according to an example embodiment. The apparatus is configured in a network device and the apparatus includes: a first sending module 1410 and a second sending module 1420.

The first sending module 1410 is configured to send a first slot offset value in a first downlink transmission, wherein the first slot offset value is used to determine a time interval between an uplink transmission and a target downlink transmission.

The second sending module 1420 is configured to send target indication information, wherein the target indication information includes first indication information and/or second indication information, the first indication information is used to indicate that the first slot offset value is a relative slot offset value or an absolute slot offset value, and the second indication information is used to indicate a relative offset object when the first slot offset value is the relative slot offset value;

wherein the first slot offset value and the target indication information are used to determine a time domain position of the uplink transmission.

In this embodiment of the present disclosure, the network device sends the first downlink transmission, and the first downlink transmission carries the first time slot offset value. The first time slot offset value is used by the terminal to determine the time interval between the uplink transmission and the target downlink transmission. The network device sends the target indication information, and the target indication information includes the first indication information and/or the second indication information. That is, the target indication information may include only the first indication information, may include only the second indication information, or may include both the first indication information and the second indication information. The first indication information is used to indicate that the first time slot offset value is a relative time slot offset value or an absolute time slot offset value, and the second indication information is used to indicate a relative offset object when the first slot offset value is the relative slot offset value. In this way, the network device can indicate the time slot offset value between the terminal's uplink transmission and the target downlink transmission by sending the first time slot offset value and the target indication information, so that the terminal can determine the time domain position of the uplink transmission.

Figure 15:
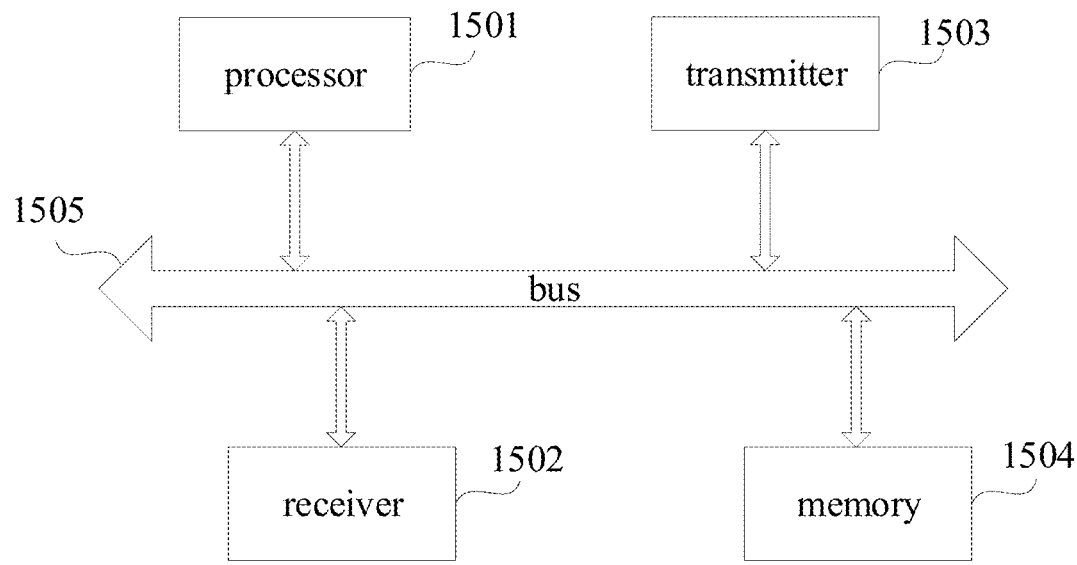
FIG. 15 is a schematic structural diagram of a terminal provided by an example embodiment of the present disclosure.

FIG. 15 shows a schematic structural diagram of a terminal provided by an example embodiment of the present disclosure. The terminal includes: a processor 1501, a receiver 1502, a transmitter 1503, a memory 1504 and a bus 1505.

The processor 1501 includes one or more processing cores, and the processor 1501 executes various functional applications and information processing by running software programs and modules.

The receiver 1502 and the transmitter 1503 may be implemented as a communication component, which may be a communication chip.

The memory 1504 is connected to the processor 1501 through the bus 1505.

The memory 1504 may be used to store at least one instruction, and the processor 1501 is used to execute the at least one instruction, so as to implement various steps performed by the first IAB base station in each of the foregoing method embodiments.

In addition, the memory 1504 may be implemented by any type of volatile or non-volatile storage device or their combination. The volatile or non-volatile storage device includes but not limited to: magnetic disk or optical disk, Electrically Erasable Programmable read only memory (EEPROM), Erasable Programmable Read-Only Memory (EPROM), Static Random Access Memory (SRAM), Read Only Memory (ROM), magnetic memory, flash memory, or Programmable Read-Only Memory (PROM).

The present disclosure provides a computer-readable storage medium, at least one instruction is stored in the storage medium, and the at least one instruction is loaded and executed by the processor to implement the information indication methods provided by the above method embodiments.

The present disclosure also provides a computer program product. When the computer program product runs on a computer, the computer is caused to implement the information indication methods provided by the above method embodiments.

Figure 16:
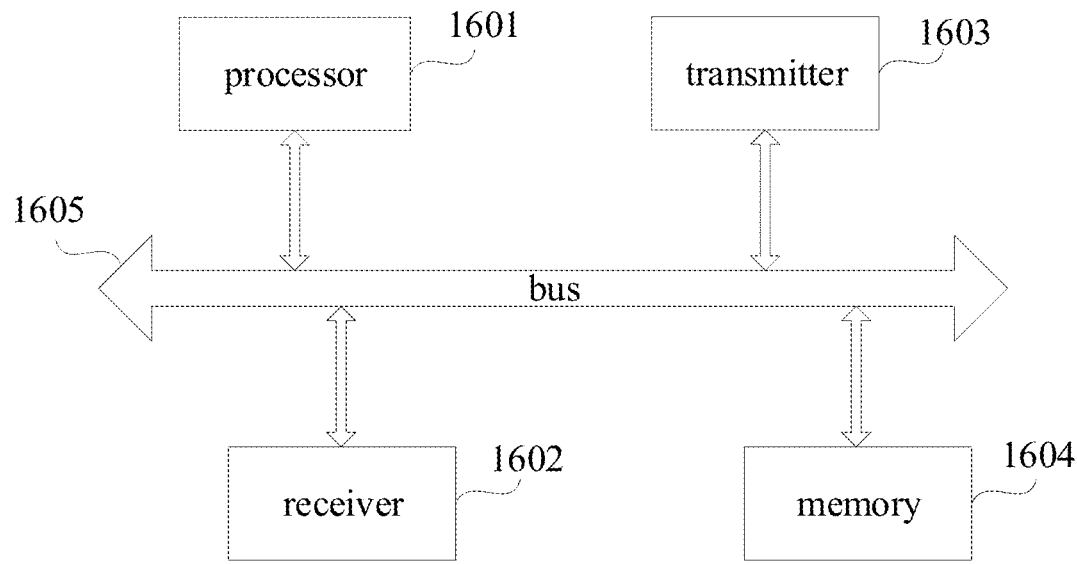
FIG. 16 is a schematic structural diagram of a network device provided by an example embodiment of the present disclosure.

FIG. 16 shows a schematic structural diagram of a network device provided by an example embodiment of the present application. The network device includes: a processor 1601, a receiver 1602, a transmitter 1603, a memory 1604 and a bus 1605.

The processor 1601 includes one or more processing cores, and the processor 1601 executes various functional applications and information processing by running software programs and modules.

The receiver 1602 and the transmitter 1603 may be implemented as a communication component, which may be a communication chip.

The memory 1604 is connected to the processor 1601 through the bus 1605.

The memory 1604 may be used to store at least one instruction, and the processor 1601 is used to execute the at least one instruction, so as to implement various steps performed by the network device in each of the foregoing method embodiments.

In addition, the memory 1604 may be implemented by any type of volatile or non-volatile storage device or their combination. The volatile or non-volatile storage device includes but not limited to: magnetic disk or optical disk, EEPROM, EPROM, SRAM, ROM, magnetic memory, flash memory, or PROM.

The present disclosure provides a computer-readable storage medium, at least one instruction is stored in the storage medium, and the at least one instruction is loaded and executed by the processor to implement the information indication methods provided by the above method embodiments.

The present disclosure also provides a computer program product. When the computer program product runs on a computer, the computer is caused to implement the information indication methods provided by the above method embodiments.

Those skilled in the art should be aware that, in the foregoing one or more examples, the functions described in the embodiments of the present disclosure may be implemented by hardware, software, firmware or any combination thereof. When implemented in software, the functions may be stored in a computer-readable medium, or may be transmitted over as one or more instructions or code on a computer-readable medium. The computer-readable medium includes a computer storage medium and a communication medium, and the communication medium includes any medium that facilitates transfer of a computer program from one place to another. The storage medium may be any available medium that can be accessed by a general purpose or special purpose computer.

The above descriptions are only example embodiments of the present disclosure, and are not intended to limit the present disclosure. Any modifications, equivalent replacements, improvements, etc. made within the spirit and principles of the present disclosure fall with the protection scope of the present disclosure.

What is claimed is:

1. An information indication method, wherein the method is applied to a terminal and the method comprises:
    obtaining a first slot offset value from a first downlink transmission, wherein the first slot offset value is used to determine a time interval between an uplink transmission and a target downlink transmission;
    receiving target indication information, wherein the target indication information comprises first indication information and/or second indication information, the first indication information is used to indicate that the first slot offset value is a relative slot offset value or an absolute slot offset value, and the second indication information is used to indicate a relative offset object when the first slot offset value is the relative slot offset value; and
    determining a time domain position of the uplink transmission based on the first slot offset value and the target indication information.

2. The method according to claim 1, wherein the target indication information comprises the first indication information, the first downlink transmission is a downlink transmission of a random access response, and the target downlink transmission is the downlink transmission of the random access response;
    wherein determining the time domain position of the uplink transmission based on the first slot offset value and the target indication information comprises:
        determining a first downlink slot number of the target downlink transmission;
        determining a first parameter based on uplink subcarrier spacing of the uplink transmission; and
        determining the time domain position of the uplink transmission based on the first downlink slot number, the first parameter, the first slot offset value and the first indication information.

3. The method according to claim 2, wherein determining the time domain position of the uplink transmission based on the first downlink slot number, the first parameter, the first slot offset value and the first indication information comprises:
    in response to that the first indication information indicates that the first slot offset value is the absolute slot offset value, obtaining a first uplink slot number by adding the first downlink slot number, the first parameter and the first slot offset value; and
    determining the time domain position of the uplink transmission based on the first uplink slot number.

4. The method according to claim 2, wherein determining the time domain position of the uplink transmission based on the first downlink slot number, the first parameter, the first slot offset value and the first indication information comprises:
    in response to that the first indication information indicates that the first slot offset value is the relative slot offset value, obtaining a reference slot offset value;
    obtaining a second uplink slot number by adding the first downlink slot number, the first parameter, the first slot offset value and the reference slot offset value; and
    determining the time domain position of the uplink transmission based on the second uplink slot number.

5. The method according to claim 1, wherein the target indication information comprises the first indication information, the first downlink transmission is a first Physical Downlink Control Channel (PDCCH) indicating uplink scheduling, and the target downlink transmission is the first PDCCH;

wherein determining the time domain position of the uplink transmission based on the first slot offset value and the target indication information comprises:

determining a second downlink slot number of the first PDCCH; and determining the time domain position of the uplink transmission based on the second downlink slot number, uplink subcarrier spacing of the uplink transmission, downlink subcarrier spacing of the target downlink transmission, the first slot offset value and the first indication information.

6. The method according to claim 5, wherein determining the time domain position of the uplink transmission based on the second downlink slot number, the uplink subcarrier spacing of the uplink transmission, the downlink subcarrier spacing of the target downlink transmission, the first slot offset value and the first indication information comprises:

in response to that the first indication information indicates that the first slot offset value is the absolute slot offset value, determining the time domain position of the uplink transmission based on the second downlink slot number, the uplink subcarrier spacing of the uplink transmission, the downlink subcarrier spacing of the target downlink transmission and the first slot offset value.

7. The method according to claim 1, wherein the target indication information comprises the first indication information, the first downlink transmission is a second PDCCH indicating downlink scheduling, and the target downlink transmission is a first Physical Downlink Shared Channel (PDSCH);

wherein determining the time domain position of the uplink transmission based on the first slot offset value and the target indication information comprises:

determining a third downlink slot number of the first PDSCH; and determining the time domain position of the uplink transmission based on the third downlink slot number, the first slot offset value and the first indication information.

8. The method according to claim 7, wherein determining the time domain position of the uplink transmission based on the third downlink slot number, the first slot offset value and the first indication information comprises:

in response to that the first indication information indicates that the first slot offset value is the absolute slot offset value, determining the time domain position of the uplink transmission based on the third downlink slot number and the first slot offset value.

9. The method according to claim 1, wherein:

the target indication information is carried by a system message; or, the target indication information is carried by RRC signaling; or, the target indication information is carried by MAC CE.

10. A terminal comprising:

a processor; and a memory storing instructions executable by the processor;

wherein when the instructions are executed by the processor, the terminal is caused to:

obtain a first slot offset value from a first downlink transmission, wherein the first slot offset value is used to determine a time interval between an uplink transmission and a target downlink transmission;

receive target indication information, wherein the target indication information comprises first indication information and/or second indication information, the first indication information is used to indicate that the first slot offset value is a relative slot offset value or an absolute slot offset value, and the second indication information is used to indicate a relative offset object when the first slot offset value is the relative slot offset value; and determine a time domain position of the uplink transmission based on the first slot offset value and the target indication information.

11. The terminal according to claim 10, wherein the target indication information comprises the first indication information, the first downlink transmission is a downlink transmission of a random access response, and the target downlink transmission is the downlink transmission of the random access response;

wherein when the instructions are executed by the processor, the terminal is caused to:

determine a first downlink slot number of the target downlink transmission;

determine a first parameter based on uplink subcarrier spacing of the uplink transmission; and determine the time domain position of the uplink transmission based on the first downlink slot number, the first parameter, the first slot offset value and the first indication information.

12. The terminal according to claim 11, wherein when the instructions are executed by the processor, the terminal is caused to:

in response to that the first indication information indicates that the first slot offset value is the absolute slot offset value, obtain a first uplink slot number by adding the first downlink slot number, the first parameter and the first slot offset value; and determine the time domain position of the uplink transmission based on the first uplink slot number.

13. The terminal according to claim 11, wherein when the instructions are executed by the processor, the terminal is caused to:

in response to that the first indication information indicates that the first slot offset value is the relative slot offset value, obtain a reference slot offset value;

obtain a second uplink slot number by adding the first downlink slot number, the first parameter, the first slot offset value and the reference slot offset value; and determine the time domain position of the uplink transmission based on the second uplink slot number.

14. The terminal according to claim 10, wherein the target indication information comprises the first indication information, the first downlink transmission is a first Physical Downlink Control Channel (PDCCH) indicating uplink scheduling, and the target downlink transmission is the first PDCCH;

wherein when the instructions are executed by the processor, the terminal is caused to:

determine a second downlink slot number of the first PDCCH; and determine the time domain position of the uplink transmission based on the second downlink slot number, uplink subcarrier spacing of the uplink transmission, downlink subcarrier spacing of the target downlink transmission, the first slot offset value and the first indication information.

15. The terminal according to claim 14, wherein when the instructions are executed by the processor, the terminal is caused to:

in response to that the first indication information indicates that the first slot offset value is the absolute slot offset value, determine the time domain position of the uplink transmission based on the second downlink slot number, the uplink subcarrier spacing of the uplink transmission, the downlink subcarrier spacing of the target downlink transmission and the first slot offset value.

16. The terminal according to claim 10, wherein the target indication information comprises the first indication information, the first downlink transmission is a second PDCCH indicating downlink scheduling, and the target downlink transmission is a first Physical Downlink Shared Channel (PDSCH);

wherein when the instructions are executed by the processor, the terminal is caused to:
  determine a third downlink slot number of the first PDSCH; and
  determine the time domain position of the uplink transmission based on the third downlink slot number, the first slot offset value and the first indication information.

17. The terminal according to claim 16, wherein when the instructions are executed by the processor, the terminal is caused to:

in response to that the first indication information indicates that the first slot offset value is the absolute slot offset value, determine the time domain position of the uplink transmission based on the third downlink slot number and the first slot offset value.

18. The terminal according to claim 10, wherein:

the target indication information is carried by a system message; or, the target indication information is carried by RRC signaling; or, the target indication information is carried by MAC CE.

19. A network device comprising:

a processor; and a memory storing instructions executable by the processor:

wherein when the instructions are executed by the processor, the network device is caused to:
  send a first slot offset value in a first downlink transmission, wherein the first slot offset value is used to determine a time interval between an uplink transmission and a target downlink transmission; and
  send target indication information, wherein the target indication information comprises first indication information and/or second indication information, the first indication information is used to indicate that the first slot offset value is a relative slot offset value or an absolute slot offset value, and the second indication information is used to indicate a relative offset object when the first slot offset value is the relative slot offset value;

wherein the first slot offset value and the target indication information are used to determine a time domain position of the uplink transmission.

\* \* \* \* \*